(12) United States Patent
Kim et al.

(10) Patent No.: US 10,945,444 B2
(45) Date of Patent: Mar. 16, 2021

(54) COOKING APPLIANCE AND METHOD FOR CONTROLLING THE SAME

(71) Applicant: Samsung Electronics Co., Ltd., Suwon-si (KR)

(72) Inventors: Kyoung Mok Kim, Yongin-si (KR); Jung Soo Lim, Hwaseong-si (KR); Yu Jeong Oh, Suwon-si (KR); Seulkiro Kim, Suwon-si (KR); Han Jun Sung, Seoul (KR); Jae Min Park, Seoul (KR); Tae-Hun Kim, Seongnam-si (KR); In Ki Jeon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 345 days.

(21) Appl. No.: 15/670,228

(22) Filed: Aug. 7, 2017

(65) Prior Publication Data
US 2018/0070596 A1 Mar. 15, 2018

(30) Foreign Application Priority Data

Sep. 9, 2016 (KR) .......................... 10-2016-0116655

(51) Int. Cl.
*A21B 3/04* (2006.01)
*F24C 7/08* (2006.01)
(Continued)

(52) U.S. Cl.
CPC .................. *A21B 3/04* (2013.01); *A47J 27/04* (2013.01); *F24C 7/087* (2013.01); *F24C 14/005* (2013.01);
(Continued)

(58) Field of Classification Search
CPC . A21B 3/04; A47J 27/04; A47J 27/043; A47J 27/14; A47J 27/16; A47J 2027/043;
(Continued)

(56) References Cited

U.S. PATENT DOCUMENTS

| 2012/0145696 | A1* | 6/2012 | Johnson | F24C 14/005 |
| | | | | 219/401 |
| 2014/0251158 | A1* | 9/2014 | Yang | A47J 27/04 |
| | | | | 99/341 |
| 2017/0122570 | A1* | 5/2017 | Menominee | F24C 15/164 |

FOREIGN PATENT DOCUMENTS

| EP | 2009959 | 12/2008 |
| JP | 2005-90940 | 4/2005 |

(Continued)

OTHER PUBLICATIONS

International Search Report dated Dec. 20, 2017 in International Patent Application No. PCT/KR2017/009484.
(Continued)

*Primary Examiner* — Shawntina T Fuqua
(74) *Attorney, Agent, or Firm* — Staas & Halsey LLP

(57) ABSTRACT

A cooking appliance including a cleaning environment provided to be able to easily remove contaminants inside the cooking appliance by heating the inside of a cooking room to a temperature for amorphization of the contaminants, and method for controlling the same. The cooking appliance includes a main body configured to have a cooking room; a steam generator configured to supply steam to the cooking room; a water supplier arranged in the main body and configured to store water; and a pump assembly configured to supply water to the steam generator and the cooking room from the water supplier.

19 Claims, 20 Drawing Sheets

(51) Int. Cl.
   *A47J 27/04* (2006.01)
   *F24C 14/00* (2006.01)
   *F24C 15/32* (2006.01)

(52) U.S. Cl.
   CPC ....... *F24C 15/327* (2013.01); *A47J 2027/043* (2013.01)

(58) Field of Classification Search
   CPC .... F24C 14/005; F24C 15/003; F24C 15/327; F24C 7/087
   See application file for complete search history.

(56) References Cited

FOREIGN PATENT DOCUMENTS

| | | |
|---|---|---|
| JP | 2006-46752 | 2/2006 |
| JP | 2016-56971 | 4/2016 |
| KR | 10-2005-0037732 | 4/2005 |
| KR | 10-2008-0032708 | 4/2008 |
| KR | 10-2009-0061888 | 6/2009 |
| KR | 10-2010-0111203 | 10/2010 |
| KR | 10-2010-0120014 | 11/2010 |
| KR | 10-2012-0016697 | 2/2012 |
| KR | 10-1217996 | 1/2013 |
| KR | 10-2013-0029646 | 3/2013 |
| WO | 2008/044844 | 4/2008 |

OTHER PUBLICATIONS

Chinese Office Action dated Mar. 12, 2020 in Chinese Patent Application No. 201780052489.9.
Chinese Office Action dated Sep. 17, 2020 in Chinese Patent Application No. 201780052489.9.
European Communication dated Oct. 28, 2020 in European Patent Application No. 17849021.5.

* cited by examiner

32

PLEASE OPEN THE DOOR
AND REMOVE CONTAMINANTS

COOKING APPLIANCE AND METHOD FOR CONTROLLING THE SAME

CROSS-REFERENCE TO RELATED APPLICATION

This application claims priority to and the benefit of Korean Patent Application No. 10-2016-0116655, filed on Sep. 9, 2016, the disclosure of which is incorporated herein by reference in its entirety.

BACKGROUND

1. Field

The present disclosure relates to a cooking appliance and method for controlling the same to cook an object by heating a cooking room.

2. Discussion of Related Art

A cooking appliance refers to a device configured to be able to cook food. There may be many different types of cooking appliances, and an example of them is the oven. Typically, the oven refers to a device for cooking food by providing heat into a cooking room and circulating the heat inside the cooking room.

The oven may be classified by types of heat source into electric oven, gas oven, and microwave oven. The electric oven uses an electric heater as a heat source, and gas and microwave ovens use heat from gas and frictional heat of water molecules at high frequencies as heat sources, respectively.

While food inside the oven is heated, combusted oxides, oil mist, etc., along with vapor may be produced on the surface of the food. Some of the oil mist produced at a general cooking temperature of approximately 150° C. to approximately 250° C. is discharged out of the oven, but the others may remain around the inner wall of the cooking room. If the oven is used for a long time while leaving the remaining oil mist unattended, the inner wall of the cooking room may be contaminated and may smell bad.

Therefore, the user needs to periodically remove the oil mist remaining in the oven. However, because the oil mist is distributed throughout the inner wall of the cooking room, making it difficult for the user to clean it, there is a need for the oven to provide an environment to effectively remove the oil mist remaining in the cooking room.

SUMMARY

The present disclosure provides a cooking appliance and method for controlling the same, by which a cleaning environment is provided to be able to easily remove contaminants inside by heating the inside of a cooking room with a temperature for amorphization of the contaminants.

In accordance with an aspect of the present disclosure, a cooking appliance includes a main body configured to have a cooking room; a steam generator configured to supply steam to the cooking room; a water supplier arranged in the main body and configured to store water; and a pump assembly configured to supply water to the steam generator and the cooking room from the water supplier.

The pump assembly may be configured to directly supply water from the water supplier to the cooking room heated to a predetermined temperature.

The pump assembly may include a first pump configured to supply water from the water supplier to the steam generator; a second pump configured to turn water back to the water supplier from the steam generator; and a third pump configured to supply water from the water supplier to the cooking room.

The cooking appliance may further include a connecting pipe configured to connect the third pump and the inside of the cooking room.

The steam generator may include a water level measurer configured to detect a water level, and wherein the water supplied by the first pump to the steam generator is measured by the water level measurer and turned by the second pump back to the water supplier.

In accordance with an aspect of the present disclosure, a cooking appliance may include a main body configured to have a cooking room; a cooking room heater configured to provide heat for the cooking room; a water supplier arranged in the main body and configured to store water; a pump assembly configured to supply water to the steam generator from the water supplier; and a controller configured to control the cooking room heater to heat the cooking room at a first target temperature for a predetermined heating time and control the pump assembly to supply a predetermined amount of water for steam generation to the cooking room before or during the heating time.

The controller may be configured to control the pump assembly to supply the predetermined amount of water to the cooking room at at least a predetermined point of time to supply water before or during the heating time, and the controller may be configured to equally divide the predetermined amount of water and supply the division of water to the cooking room at each point of time to supply water if there are a plurality of points of time to supply water.

The controller may be configured to control the cooking room heater to heat the cooking room to the first target temperature of approximately 250° C. to approximately 400° C. during the heating time.

The controller may be configured to control the cooking room heater to heat one face of the cooking room with water remaining thereon to generate steam, if the cooking room is cooled down to a second target temperature less than the first target temperature after the heating time, and the controller may be configured to control the cooking room heater to heat the cooking room for the generated steam to reach a third target temperature.

The cooking room heater may include a convection heater heated to provide heat into the cooking room.

The cooking room heater may include a heat coating formed by applying a heating substance heated when electric power is applied on at least one of inner walls of the cooking room.

The cooking room heater may include a light source configured to irradiate light on an inner wall of the cooking room to provide heat to the inside of the cooking room.

The cooking appliance may further include a display configured to display an indication to prompt removal of contaminants inside the cooking room after the cleaning mode is completed; and an input unit configured to receive a command to start the cleaning mode, and the controller may be configured to control the cooking room heater to heat the cooking room at a first target temperature for a predetermined heating time and control the pump assembly to supply a predetermined amount of water for steam generation to the cooking room before or during the heating time, if it is determined that the predetermined amount of water is stored in the water supplier after the command to start the cleaning mode is received, and the controller may be configured to control the display to display an indication of water shortage in the water supplier if it is determined that the predetermined amount of water is not stored in the water supplier after the command to start the cleaning mode is received.

In accordance with an aspect of the present disclosure, a method for controlling a cooking appliance, the method may include receiving a command to start a cleaning mode; heating a cooking room of the cooking appliance to a first target temperature for a predetermined heating time; and supplying a predetermined amount of water for steam generation to the cooking room from a water supplier before or during the heating time.

The supplying a predetermined amount of water for steam generation to the cooking room from a water supplier before or during the heating time may include supplying the predetermined amount of water to the cooking room at at least a predetermined point of time to supply water before or during the heating time, and the supplying a predetermined amount of water for steam generation to the cooking room from a water supplier before or during the heating time may include equally dividing the predetermined amount of water and supplying the division of water to the cooking room at each point of time to supply water if there are a plurality of points of time to supply water.

The heating a cooking room of the cooking appliance to a first target temperature for a predetermined heating time may include heating the cooking room to the first target temperature of approximately 250° C. to approximately 400° C. during the heating time.

The method may further include heating one face of the cooking room with water remaining thereon to generate steam from the water, if the cooking room is cooled down to a second target temperature less than the first target temperature after the heating time; and heating the cooking room for the generated steam to reach a third target temperature.

The heating a cooking room of the cooking appliance to a first target temperature for a predetermined heating time may include heating a convection heater to provide heat to the inside of the cooking room.

The heating a cooking room of the cooking appliance to a first target temperature for a predetermined heating time may include applying electric power to a heat coating formed by applying a heating substance on at least one of inner walls of the cooking room to provide heat to the inside of the cooking room.

The method may further include displaying an indication to prompt removal of contaminants inside the cooking room after the cleaning mode is completed.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
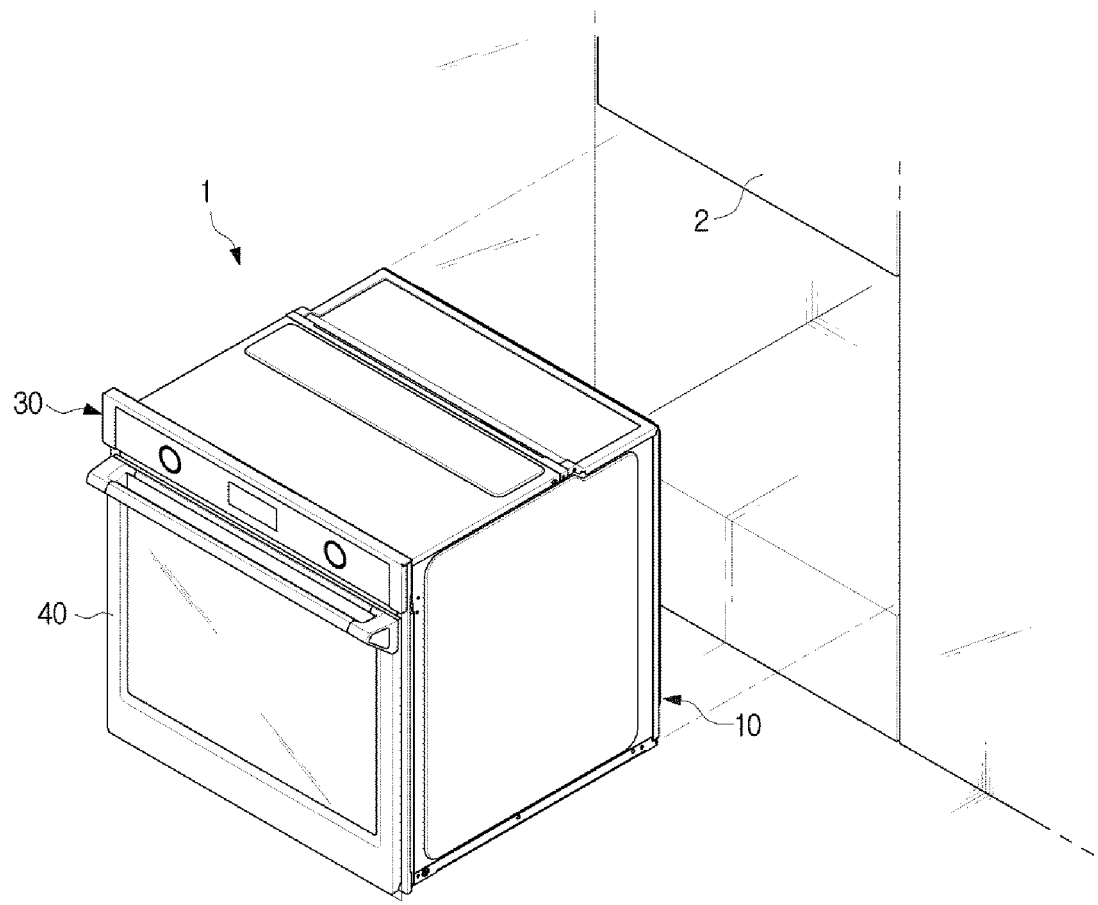
FIG. 1 is a perspective view of a cooking appliance, according to an embodiment of the present disclosure.

Embodiments and features as described and illustrated in the present disclosure are only examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

Reference will now be made in detail to embodiments, examples of which are illustrated in the accompanying drawings, wherein like reference numerals refer to the like elements throughout.

The terms 'front' and 'forward' as herein used refer to a front face and front direction viewed from a cooking appliance 1 as shown in FIG. 1, and 'rear' refers to a direction facing the back of the cooking appliance 1. The cooking appliance in accordance with an embodiment of the present disclosure will be assumed herein to be installed inside a decoration cabinet as a built-in appliance, without being limited thereto.

Figure 2:
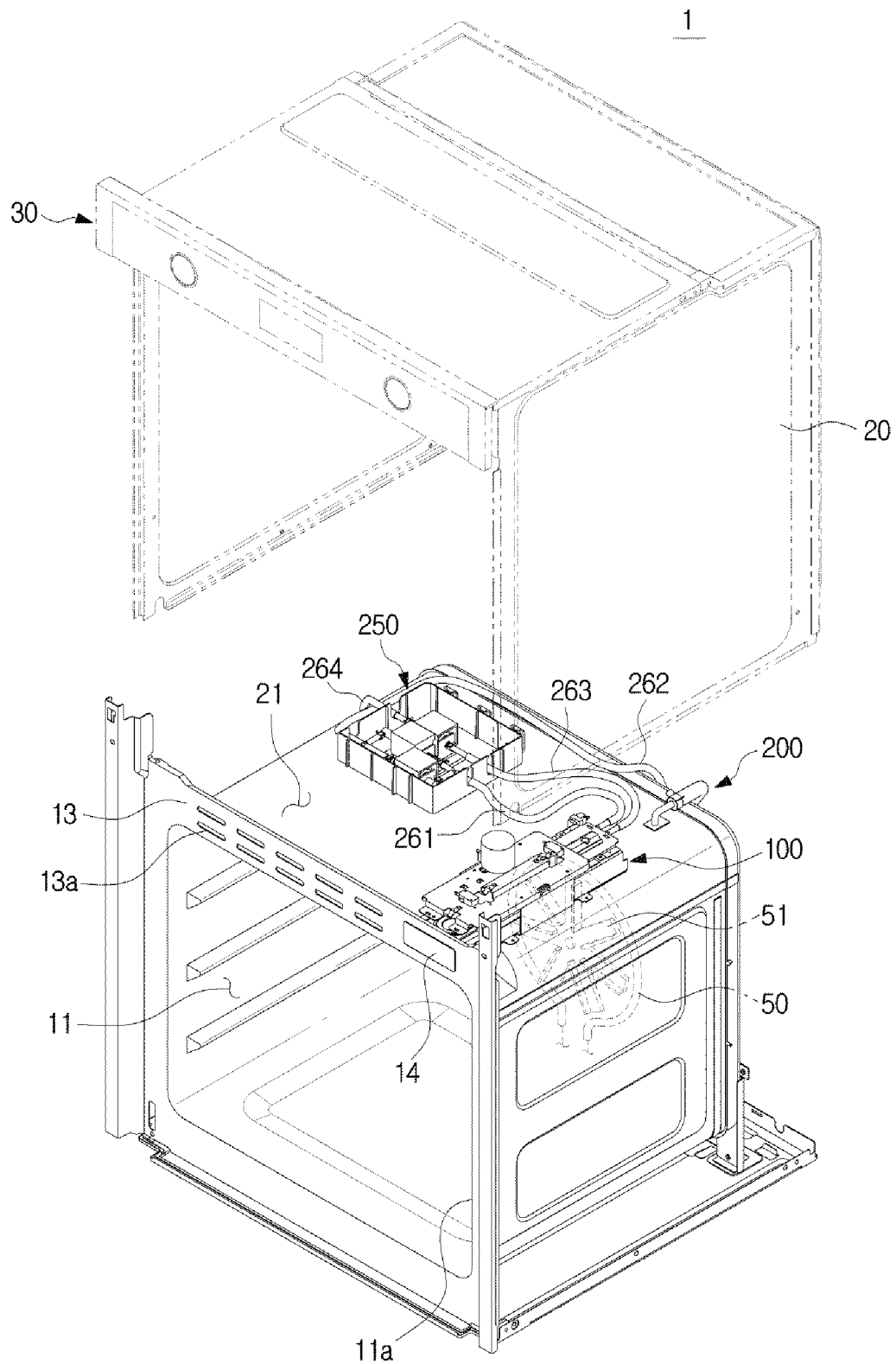
FIG. 2 is a perspective view illustrating a cooking appliance with some parts separated therefrom, according to an embodiment of the present disclosure.
Figure 3:
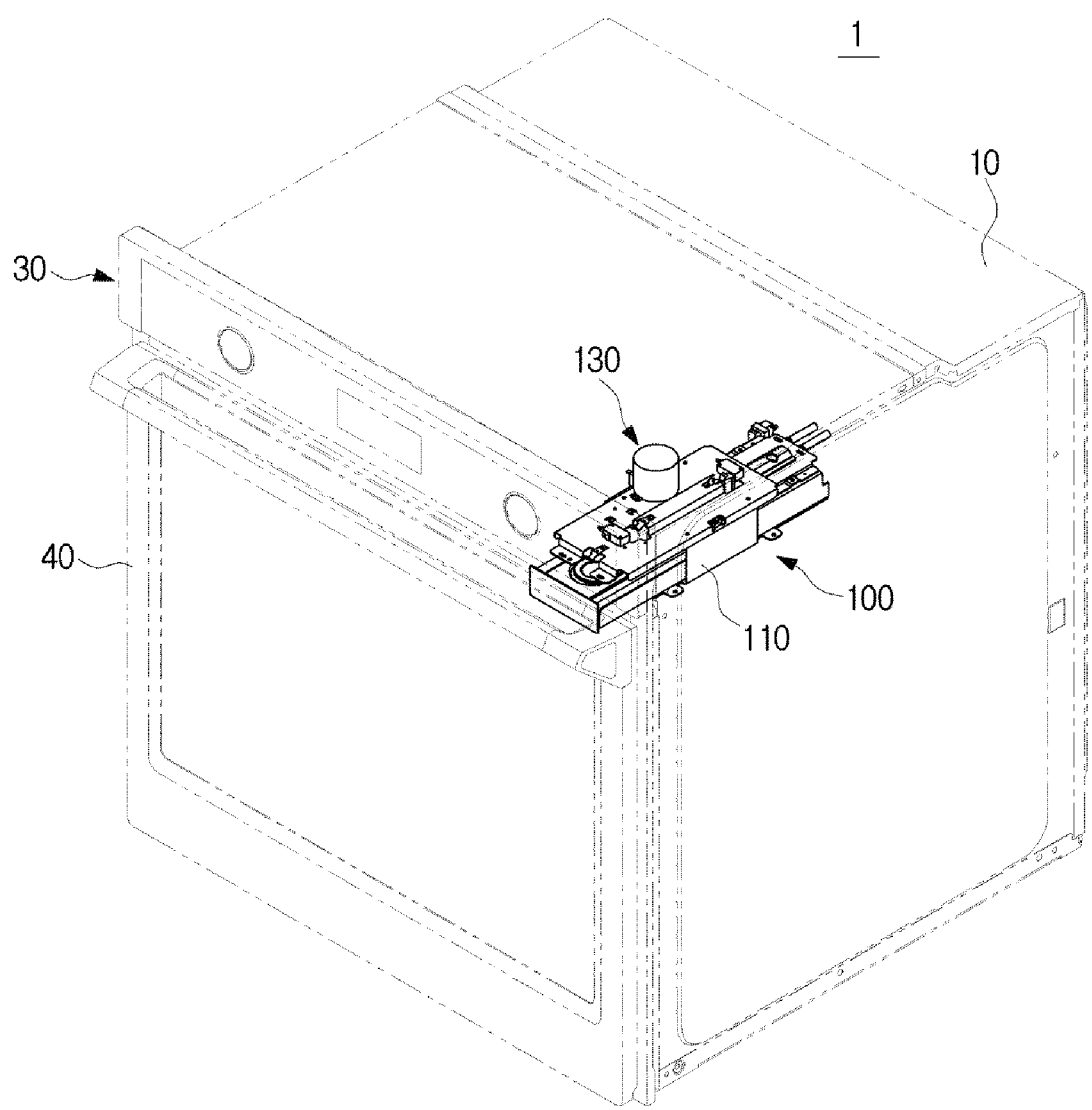
FIGS. 3 and 4 show states of a water supplier based on door operation, according to an embodiment of the present disclosure.
Figure 4:
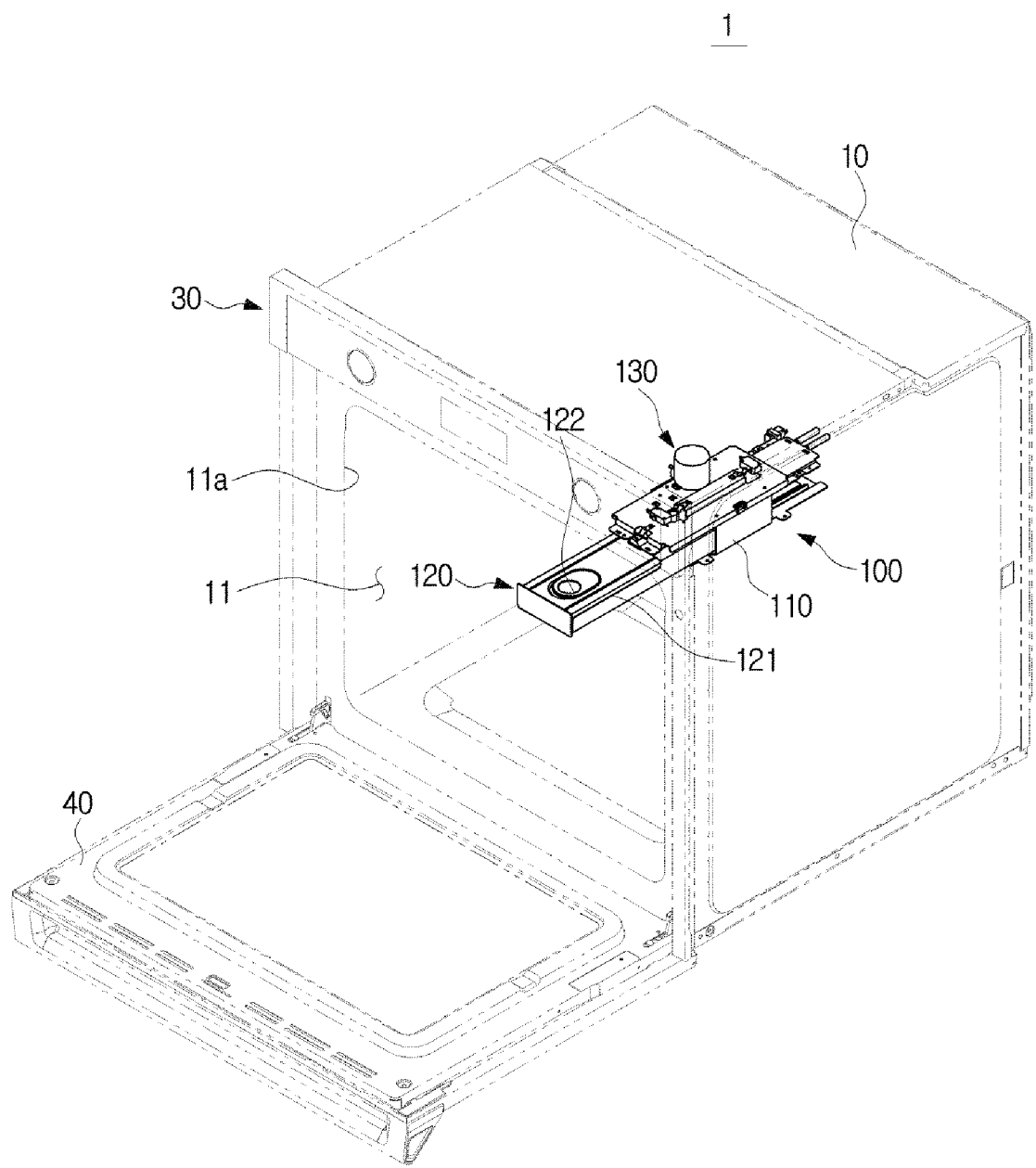

FIG. 1 is a perspective view of a cooking appliance, according to an embodiment of the present disclosure, FIG. 2 is a perspective view illustrating a cooking appliance with some parts separated therefrom, according to an embodiment of the present disclosure, and FIGS. 3 and 4 show states of a water supplier based on door operation, according to an embodiment of the present disclosure.

As shown in FIGS. 1 to 4, the cooking appliance 1 may be installed inside a wall or a cabinet 2 to give a sense of unity with the kitchen. The cabinet 2 in which the cooking appliance 1 is to be installed may have e.g., an open part of the front face, through which the cooking appliance 1 may be received in the cabinet 2.

The cooking appliance 1 may include a main body 10, a first space (hereinafter, referred to as a cooking room, or compartment, 11) formed in the main body 10 for cooking, and a second space (hereinafter, referred to as a machine room 21) formed outside the main body 10 for installation of various electronic parts.

The main body 10 may further include a case 20 that forms the exterior of the main body 10. The case 20 may be formed to make a room with the main body 10, the room being outside the main body 10.

A control panel 30 equipped with various buttons (not shown) for the user to control operation of the cooking appliance 1 may be installed on the front of the case 20.

A convection heater 50 and/or convection fan 51 configured to heat the cooking room 11 may be installed on at least one of the top, bottom, both sides, and back of the main body 10. The main body 10 may also include a steam generator 200 for generating and supplying steam into the cooking room 11.

The convection heater 50 may provide heat to heat food inside the cooking room 11, and the convection fan 51 may circulate the heat generated from the convection heater 50 inside the cooking room 11 or have steam generated from the steam generator 200, aside from the convection heater 50, circulated evenly inside the cooking room 11. The steam generator 200 is arranged in the main body 10, and may be connected to a water supplier 100 for supplying water to the steam generator 200. The water supplier 100 may be configured to supply steam into the cooking room 11 in the main body 10. The water supplier 100 may be located on the top of the main body 10.

The machine room 21 for containing parts to control environments inside the cooking room 11 may be arranged on the top of the main body 10. The control panel 30 for the user to control operation of the cooking appliance 1 may be arranged on the front top of the main body 10.

The water supplier 100 may be arranged in the machine room 21 of the main body 10. The water supplier 100 may be arranged on the front top of the machine room 21. The water supplier 100 may be movably arranged to be pushed into or pulled out of the machine room 21 in the front and back direction.

The main body 10 may have a hexahedral form with the front open, and an object to be cooked may be brought in and out through an opening 11a in the front. The cooking room 11 receiving an object may be opened and closed by a door 40 combined with the front of the main body 10. The door 40 may selectively open or close the cooking room 11.

The door 40 may be formed in a size corresponding to the front face of the main body 10. The door 40 may be pivotally combined with the front bottom of the main body 10 to open and close the cooking room 11. While the door 40 formed to pivot around a hinge (not shown) at the bottom end of the main body 10 is provided as an example, the present disclosure is not limited thereto. For example, there may be various ways to open and close the door or to combine the door.

The front face of the main body 10 may include the opening 11a that forms the cooking room 11. There may be a front frame 13 formed on the top of the opening 11a. The front frame 13 is formed outside the cooking room 11. The front frame 13 may include at least a part of the machine room 21. At least one hole 13a may also be formed in the front frame 13. The hole 13a may be formed to draw outside air into the machine room 21 of the cooking appliance 1. While the front frame 13 is shown to be formed on the top of the opening 11a in the embodiment of the present disclosure, the present disclosure is not limited thereto. For example, the front frame 13 may be formed in the bottom or a side of the opening 11a.

A water supplier installation hole 14 for installation of the water supplier 100 may be formed in the front frame 13. The water supplier installation hole 14 may be formed at an end of a side of the front frame 13. The water supplier 100 may be arranged behind the water supplier installation hole 14, i.e., inside of the machine room 21 to be pushed in and pulled out of the front frame 13.

The door 40 may be formed in a size and shape corresponding to the front face of the main body 10. The door 40 may be formed to open and close the cooking room 11. The door 40 may be formed to open and close the opening 11a of the main body 10. The door 40 may be formed to have a size and shape corresponding to the size and shape of the front frame 13 of the main body 10 to cover the front frame 13.

When opened, the door 40 is pivoted on the bottom end of the main body 10 with the top end of the door 40 moving down and forward to open the cooking room 11. When the door 40 is opened, the water supplier 100 arranged on the front top of the main body 10 may be exposed forward. With the door 40 opened, the water supplier 100 may be exposed to the outside of the main body 10. The water supplier 100 may be movably arranged to be pushed back inside or pulled out forward for the user to supply water, when the door 40 is opened.

When closed, the door 40 is pivoted on the bottom end of the main body 10 with the top end of the door 40 moving up and backward to close the cooking room 11. With the door 40 closed, the water supplier 100 may be pushed back inside of the main body 10 and covered by the door 40. With the door 40 closed, the water supplier 100 may be hidden by the door 40 not to be exposed from outside of the cooking appliance 1.

Figure 5:
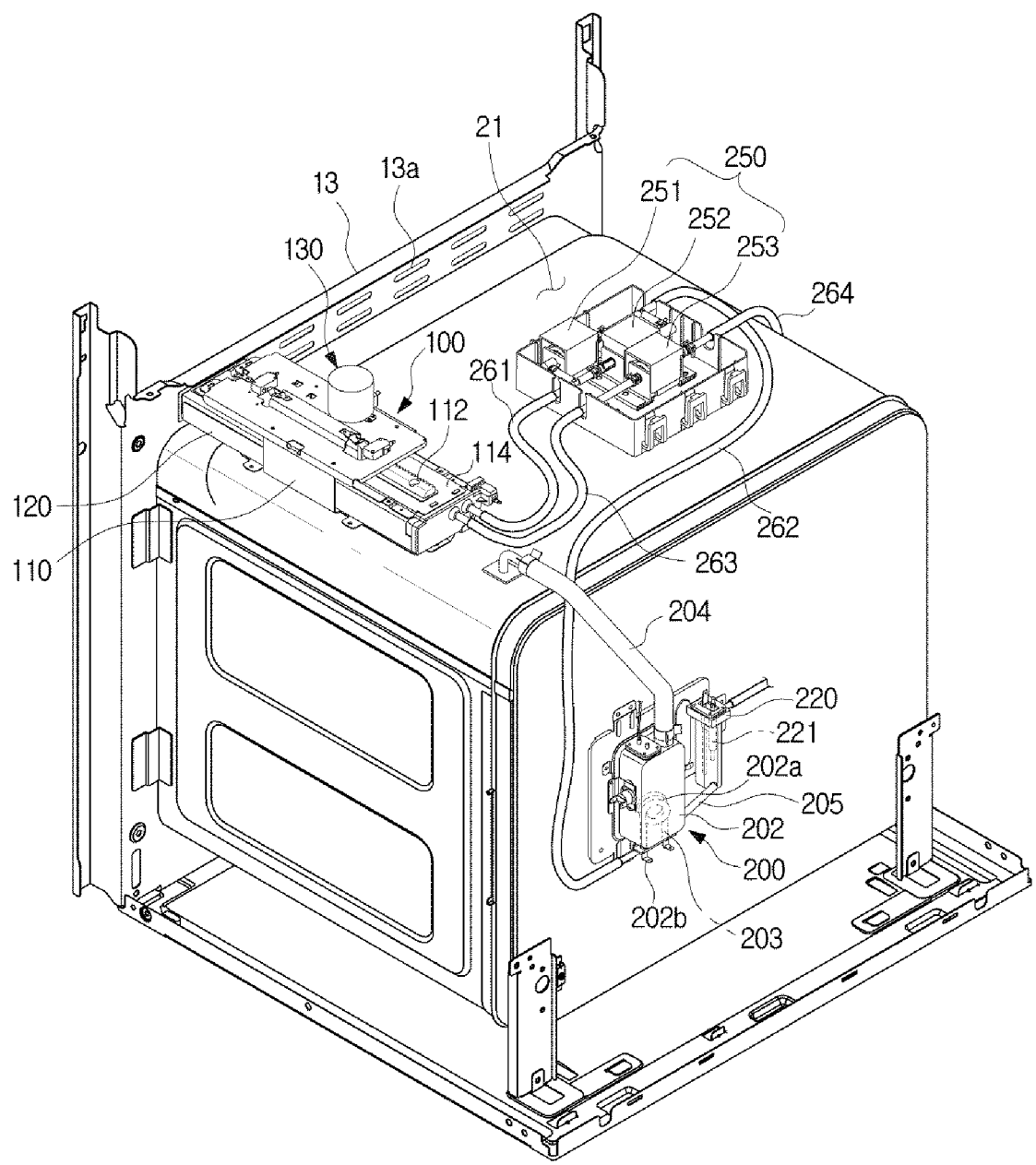
FIG. 5 is a rear perspective view illustrating a cooking appliance with some parts separated therefrom, according to an embodiment of the present disclosure.
Figure 6:
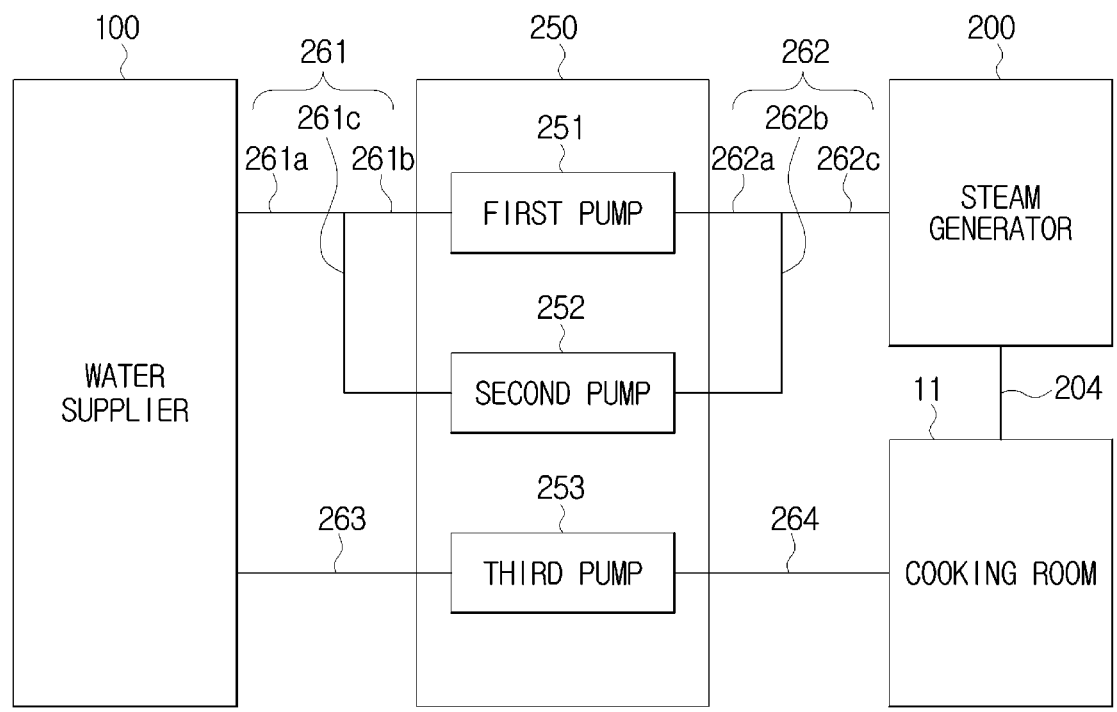
FIG. 6 is a schematic diagram illustrating connection between components, according to an embodiment of the present disclosure.

FIG. 5 is a rear perspective view illustrating a cooking appliance with some parts separated therefrom, according to an embodiment of the present disclosure, and FIG. 6 is a schematic diagram illustrating connection between components, according to an embodiment of the present disclosure.

The water supplier 100 may be connected to the steam generator 200 through a pump assembly 250. The water supplier 100 may supply water required to generate steam. Furthermore, the water supplier 100 may supply water for cleaning to the inside of the cooking room 11.

The water supplier 100 may include a housing 110 fixed to the machine room 21 of the main body 10, and a water reservoir 120 movably arranged to be pushed in or pulled out of the housing 110.

The housing 110 of the water supplier 100 may be arranged in the front of one side of the machine room 21. The housing 110 may be fixed on one side of the front of the machine room 21.

The water reservoir 120 may include a water tank 121 arranged to be pulled forward of the main body 10. The water tank 121 may be formed to store water. There may be an inlet 122 formed on the top of the water tank 121 to receive water into the water tank 121. The inlet 122 may be formed on the top front of the water tank 121. The water tank 121 may be fixed to a moving bracket 114 of a rail 112 and may slide in the front and back direction of the main body 10 according to the movement of the moving bracket 114.

There may be a driver 130 arranged on the top of the water tank 121 to automatically move the water tank 121 forward and backward.

The steam generator 200 may be configured to generate steam by heating water supplied from the water supplier 100. The steam generated by the steam generator 200 may be supplied into the cooking room 11. The steam generator 200 may include an auxiliary steam generator 220. The auxiliary steam generator 220 may include a water level measuring sensor 221 for measuring a level of water stored in the steam generator 200.

While the water level measuring sensor 221 is located in the steam generator 200 in the embodiment, it may be located in the water supplier 100 as well.

The steam generator 200 may include a steam container 202 for storing water flowing in from the water supplier 100, a heater 203 for heating the water stored in the steam container 202, and a steam supply pipe 204 for guiding the steam generated by heating of the heater 203 into the cooking room 11. The steam supply pipe 204 may be connected to the top of the main body 10.

The heater 203 located inside the steam container 202 may include a heater coil 202a, and an electrode 202b formed by the heater coil 202a extending out from the steam container 202. The electrode 202b may be connected to an external power source (not shown) to apply a current to the heater coil 202a to increase temperature of the heater coil 202a.

The steam generator 200 and the auxiliary steam generator 220 may be connected to each other through an auxiliary connecting pipe 205. The auxiliary connecting pipe 205 may allow the water flowing into the steam generator 200 to simultaneously come into the auxiliary steam generator 220.

A pump assembly 250 may be arranged to enable the water to flow to or from the water supplier 100. The pump assembly 250 may be configured for the water to be supplied as steam from the water supplier 100 into the cooking room 11 through the steam generator 200, or as water for cleaning of the cooking room 11. There are no limitations on arrangement of the pump assembly 250, and in the embodiment, the pump assembly 250 may be arranged on the top of the cooking room 11, i.e., inside the machine room 21.

The pump assembly 250 may be arranged to be connected to the water supplier 100, the steam generator 200, and the cooking room 11.

The pump assembly 250 may include first, second, and third pumps 251, 252, and 253.

The first pump 251 may be configured to supply water to the steam generator 200 from the water supplier 100, and the second pump 252 may be configured to turn the water back to the water supplier 100 from the steam generator 200. The third pump 253 may be configured to supply water to the cooking room 11 from the water supplier 100.

The first and second pumps 251 and 252 may be connected to the water supplier 100 and the steam generator 200 through first and second connecting pipes 261 and 262. Specifically, the first connecting pipe 261 may include a connecting pipe 261a, and connecting pipes 261b and 261c branched from the connecting pipe 261a, and the second connecting pipe 262 may include a connecting pipe 262a, and connecting pipes 262b and 262c branched from the connecting pipe 262a. The first pump 251 may be connected to the water supplier 100 and the steam generator 250 via the connecting pipes 261a and 261b and the connecting pipes 262a and 262c, respectively, and the second pump 252 may be connected to the water supplier 100 and the steam generator 250 via the connecting pipes 261a and 261c and the connecting pipes 262b and 262c, respectively.

With this configuration, water may be supplied by the first pump 251 to the steam generator 200 from the water supplier 100 through the connecting pipes 261a, 261b, 262a, and 262c. Furthermore, water may be turned by the second pump 252 back to the water supplier 100 from the steam generator 200 through the connecting pipes 262c, 262b, 261c, and 261a. Configurations of the first and second pumps 251 and 252 and connecting pipes are not limited thereto. For example, as for the first pump 251, a plurality of connecting pipes may be connected to the water supplier 100 and the steam generator 200, and as for the second pump 252, a plurality of connecting pipes may be connected to the water supplier 100 and the steam generator 200.

The third pump 253 may be connected to the water supplier 100 and the cooking room 11 through third and fourth connecting pipes 263 and 264. That is, the water may be supplied by the third pump 253 from the water supplier 100 through the third and fourth connecting pipes 263 and 264 to the cooking room 11.

Operation of the cooking appliance with the aforementioned configuration will now be described.

A steam supply mode for supplying steam for cooking into the cooking room 11 will be explained first.

Water is supplied by the first pump 251 to the steam generator 200 from the water supplier 100. The water level measuring sensor 221 equipped in the steam generator 200 may measure an amount of supplied water. If the amount of water does not reach a predetermined amount, water is replenished through water re-supply, and if the amount of water reaches the predetermined amount, water supplying from the water supplier 100 is stopped.

Afterward, the steam generator 200 may generate steam by heating the water, and supply the steam into the cooking room 11 through the steam supply pipe 204.

Next, a cleaning mode for cleaning the inside of the cooking room 11 will now be explained.

If the cleaning mode begins, cleaning is performed following a preparation stage.

In the preparation stage, water is supplied by the first pump 251 to the steam generator 200 from the water supplier 100. The water level measuring sensor 221 equipped in the steam generator 200 measures an amount of supplied water. If the water level is not reached, i.e., if the water does not reach a predetermined amount, water replenishment is made through water re-supply. If the water level is normal, i.e., if the predetermined amount of water is supplied, water supply from the water supplier 100 is stopped.

Afterward, the predetermined amount of water stored in the steam generator 200 may be turned by the second pump 252 back to the water supplier 100 from the steam generator 200.

The water is supplied or turned back by the first and second pumps to or from the steam generator 200 to measure an amount of water stored in the water supplier 100 in the preparation stage, but in the case that the water level measurer is equipped in the water supplier 100 as described above, such a process may be skipped and the next process will be proceeded.

The preparation stage for cleaning of the cooking room 11 is ended by detecting whether the door 40 of the cooking appliance 1 is closed.

Indication that cleaning is available is displayed through a display of the control panel 30, and when a cleaning stage begins, the inside of the cooking room 11 is heated by the controller to more than a predetermined temperature.

When the inside of the cooking room 11 reaches the predetermined temperature, water is supplied by the third pump 253 to the cooking room 11 from the water supplier 100, inducing generation of steam according to the temperature inside the cooking room 11 to separate contaminants adhered to the inside of the cooking room 11 from the cooking room 11. That is, the pump assembly 250 is configured to supply water to the cooking room 11 from the water supplier 100 while the inside of the cooking room 11 is in the heated state.

In the cleaning stage, such a procedure may be performed at least once to remove contaminants from the cooking room 11.

A cooking appliance in accordance with an embodiment of the present disclosure will now be described.

Figure 7:
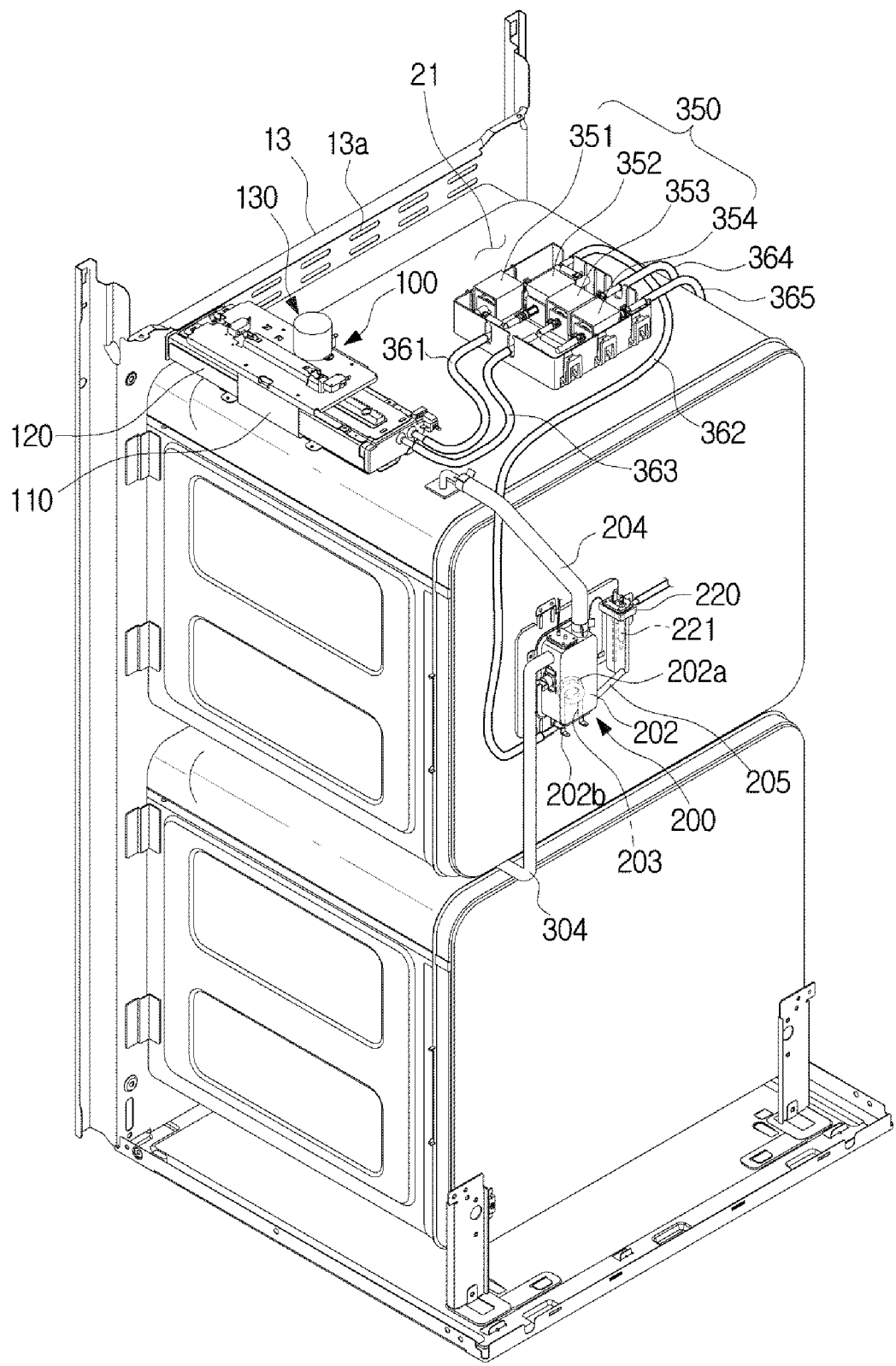
FIG. 7 is a rear perspective view illustrating a cooking appliance with some parts separated therefrom, according to an embodiment of the present disclosure.
Figure 8:
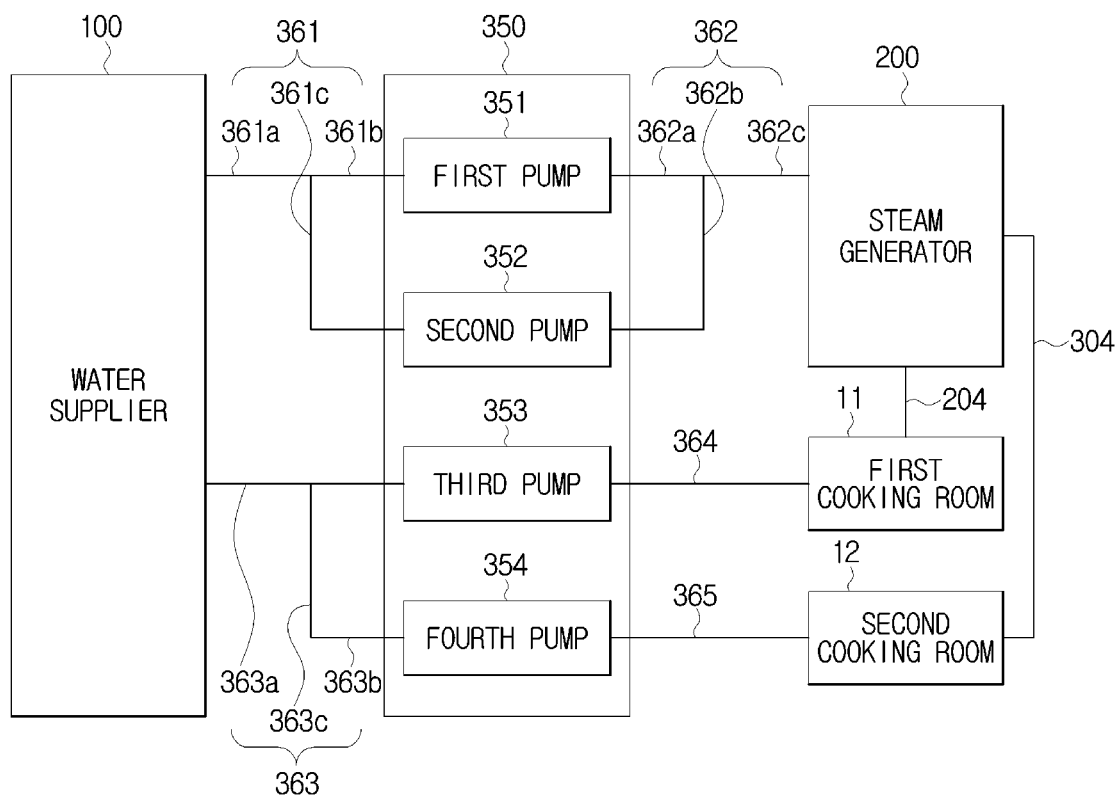
FIG. 8 is a schematic diagram illustrating connection between components, according to an embodiment of the present disclosure.

FIG. 7 is a rear perspective view illustrating a cooking appliance with some parts separated therefrom, according to an embodiment of the present disclosure, and FIG. 8 is a schematic diagram illustrating connection between components, according to an embodiment of the present disclosure.

In the following description, configurations overlapping with what are described above will be omitted.

The cooking appliance 1 may include the main body 10, a plurality of first spaces (hereinafter, referred to as a cooking room 11, 12) formed in the main body 10 for doing cooking, and the second space (hereinafter referred to as the machine room 21) formed outside of the main body 10 for installation of various electronic parts.

The cooking room may include a first cooking room 11 and a second cooking room 12.

The steam generator 200 may include first and second steam supply pipes 204 and 304 connected to the first and second cooking rooms 11 and 12.

The pump assembly 350 may include first to fourth pumps 351, 352, 353, and 354.

The first pump 351 may be configured to supply water to the steam generator 200 from the water supplier 100, and the second pump 352 may be configured to turn the water back to the water supplier 100 from the steam generator 200. The third pump 353 may be configured to supply water to the first cooking room 11 from the water supplier 100, and the fourth pump 354 may be configured to supply water to the second cooking room 12 from the water supplier 100.

The first and second pumps 351 and 352 may be connected to the water supplier 100 and the steam generator 200 through first and second connecting pipes 361 and 362.

Specifically, the first connecting pipe 361 may include a connecting pipe 361a, and connecting pipes 361b and 361c branched from the connecting pipe 361a, and the second connecting pipe 362 may include a connecting pipe 362a, and connecting pipes 362b and 362c branched from the connecting pipe 362a. The first pump 351 may be connected to the water supplier 100 and the steam generator 350 via the connecting pipes 361a and 361b and the connecting pipes 362a and 362c, respectively, and the second pump 352 may be connected to the water supplier 100 and the steam generator 350 via the connecting pipes 361a and 361c and the connecting pipes 362b and 362c, respectively.

With this configuration, water may be supplied by the first pump 351 to the steam generator 200 from the water supplier 100 through the connecting pipes 361a, 361b, 362a, and 362c. Furthermore, water may be turned by the second pump 352 back to the water supplier 100 from the steam generator 200 through the connecting pipes 362c, 362b, 361c, and 361a. Configurations of the first and second pumps 351 and 352 and connecting pipes are not limited thereto. For example, as for the first pump 351, a plurality of connecting pipes may be connected to the water supplier 100 and the steam generator 200, and as for the second pump 352, a plurality of connecting pipes may be connected to the water supplier 100 and the steam generator 200.

The third and fourth pumps 353 and 354 may be connected to the water supplier 100 through a third connecting pipe 363. Specifically, the third connecting pipe 363 may include a connecting pipe 363a, a connecting pipe 363b branched from the connecting pipe 363a and connected to the third pump 353, and a connecting pipe 363c connected to the fourth pump 354. The third pump 353 may be connected to the first cooking room 11 through a fourth connecting pipe 364, and the fourth pump 354 may be connected to the second cooking room 12 through a fifth connecting pipe 365.

Water may be supplied by the third pump 353 from the water supplier 100 through the connecting pipes 363a and 363b and fourth connecting pipe 364 to the first cooking room 11.

Water may be supplied by the fourth pump 354 from the water supplier 100 through the connecting pipes 363a and 363c and fifth connecting pipe 365 to the second cooking room 12.

Operation of the cooking appliance with the aforementioned configuration will now be described.

A steam supply mode for supplying steam for cooking into the cooking room 11 will be explained first.

Water is supplied by the first pump 351 to the steam generator 200 from the water supplier 100. The water level measuring sensor 221 equipped in the steam generator 200 may measure an amount of supplied water. If the amount of water does not reach a predetermined amount, water is replenished through water re-supply, and if the amount of water reaches the predetermined amount, water supplying from the water supplier 100 is stopped.

Afterward, the steam generator 200 may generate steam by heating water, and supply the steam into the first cooking room 11 and/or the second cooking room 12 through the steam supply pipe 204, 304.

Next, a cleaning mode for cleaning the inside of the cooking room 11 will now be explained.

If the cleaning mode begins, cleaning is performed following a preparation stage.

In the preparation stage, water is supplied by the first pump 351 to the steam generator 200 from the water supplier 100. The water level measuring sensor 221 equipped in the steam generator 200 measures an amount of supplied water. If the water level is not reached, i.e., if the water does not reach a predetermined amount, water replenishment is made through water re-supply. If the water level is normal, i.e., if the predetermined amount of water is supplied, water supply from the water supplier 100 is stopped.

Afterward, the predetermined amount of water stored in the steam generator 200 may be turned by the second pump 352 back to the water supplier 100 from the steam generator 200.

The preparation stage for cleaning of the cooking room 11 is ended by detecting whether the door of the cooking appliance is closed.

Indication that cleaning is available is displayed through the display of the control panel 30, and when the cleaning stage begins, the inside of at least one of the first and second cooking rooms 11 and 12, which is a target for cleaning, is heated by the controller to more than a predetermined temperature.

When the inside of the cooking room reaches the predetermined temperature, water is supplied by the third pump 353 and/or the fourth pump 354 to the first cooking room 11 and/or the second cooking room 12 from the water supplier 100, inducing generation of steam according to the temperature in the first and/or second cooking room 11 and/or 12 to separate contaminants adhered to the inside of the first and/or second cooking room 11 and/or 12. That is, the pump assembly 350 is configured to supply water to the cooking room 11 from the water supplier 100 even while the inside of the cooking room 11 is in the heated state. In the cleaning stage, such a procedure may be performed at least once to remove contaminants from the cooking room 11.

Configuration and schematic operation of the present disclosure have thus far been described in accordance with the aforementioned embodiments. Operation of the cleaning mode of the cooking appliance in accordance with the present disclosure will now be described in detail.

The cooking appliance may provide heat for the cooking room 11 by heating the convection heater 50, and use the heat to heat an object inside the cooking room 11, thereby cooking the object by heat. Typically, the cooking appliance may provide heat of approximately 150° C. to 200° C. to the inside of the cooking room 11 by heating the convection heater 50 to heat the object.

In this regard, not only vapor, but also contaminants, such as combustion oxides, oil mist, etc., may be produced from the surface of the heated object. Some of the contaminants may be discharged out of the cooking room 11 while some may remain adhered to the inner wall of the cooking room 11.

If cooking by heat is repeated under this condition, the contaminants on the inner wall of the cooking room 11 may form crystals through several heating-cooling procedures. Because crystals are formed when molecules that constitute a substance are regularly arranged by attractive force between them, contaminants that went through the crystallization are dense and robust and may thus be strongly adhered to the inner wall of the cooking room 11. The contaminants adhered in this way are hard to be removed by normal force, and as a result, the inside of the cooking room 11 may be contaminated by the crystallized contaminants and may thus smell bad.

Accordingly, the cooking appliance 1 needs to provide a cleaning environment for the user to easily remove the contaminants remaining inside the cooking room 11. For this, the cooking appliance 1 in accordance with an embodiment of the present disclosure may provide a cleaning environment to enable easy removal of contaminants by heating the inside of the cooking room 11 at a temperature to amorphize the contaminants. This will now be described in detail.

Figure 9:
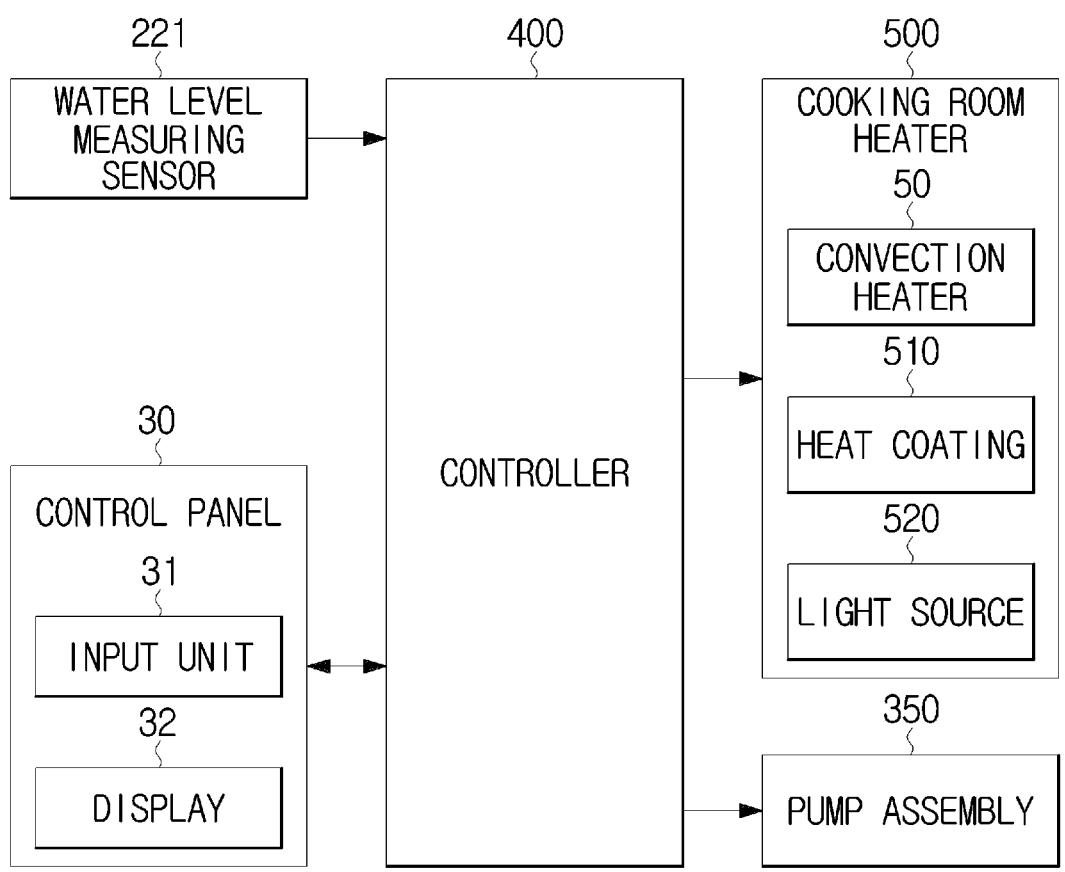
FIG. 9 is a control block diagram of a cooking appliance, according to an embodiment of the present disclosure.

FIG. 9 is a control block diagram of a cooking appliance, according to an embodiment of the present disclosure. Some of the configuration shown in FIG. 9 overlapped with those described above in connection with FIGS. 1 to 8 will be omitted, and the other configuration of the cooking appliance 1 will be explained by focusing on operation to provide a cleaning environment to enable easy removal of contaminants.

Referring to FIG. 9, the cooking appliance 1 in accordance with an embodiment may include a cooking room heater 500 for providing heat to the inside of the cooking room 11, a pump assembly 350 for supplying water into the cooking room 11, a control panel 30 for performing input and output related to a cleaning mode, and a controller 400 for controlling the cleaning mode.

The pump assembly 350 and the water level measuring sensor 221 are the same as those described above in connection with FIGS. 1 to 8, so the overlapping description thereof will be omitted.

The cooking room heater 500 may provide heat to the contaminants adhered to the inside of the cooking room 11, specifically, the inner wall of the cooking room 11. For this, the cooking room heater 500 may include the convection heater 50 heated to provide heat into the cooking room 11, a heat coating 510 formed by applying a heating substance heated when electric power is applied on at least one of inner walls of the cooking room 11, and a light source 520 for irradiating light to the inner wall of the cooking room 11 to provide heat into the cooking room 11.

The convection heater 50 may be arranged in the form and position as shown in FIGS. 1 to 8 to provide heat into the cooking room 11. Specifically, it may be arranged on one of the top, bottom, both sides, and back of the main body 10 to heat the cooking room 11. In the following description, assume that the convection heater 50 is arranged on the back of the main body along with another convection heater 50 arranged to directly heat the bottom of the cooking room.

The heat coating 510 may be formed by applying a heating substance heated when electric power is applied on at least one of the inner walls of the cooking room. The inner wall(s) of the cooking room coated with the heat coating 510 acts as a planar heating element, and so if the electric power is applied to the heat coating 510, the entire plane of the corresponding inner wall(s) of the cooking room is heated to provide heat into the cooking room.

Whereas the convection heater 50 and the heat coating 510 are directly heated to provide heat into the cooking room 11, the light source 520 may provide heat into the cooking room 11 by irradiating light onto the inner wall of the cooking room 11. For this, the light source 520 may irradiate various types of light. For example, the light source 520 may irradiate laser beams having wavelengths of 0.2 μm to 500 μm. Alternatively, the light source 520 may irradiate ion beams, which are a flow of ions taken out by high voltage.

The light source 520 may irradiate light onto the inner wall of the cooking room 11 in different ways. For example, the light source 520 may irradiate light onto a particular region where contaminants are adhered. Alternatively, it may provide heat into the cooking room 11 by irradiate light on the full face of at least one of the inner walls of the cooking room 11.

Figure 10A:
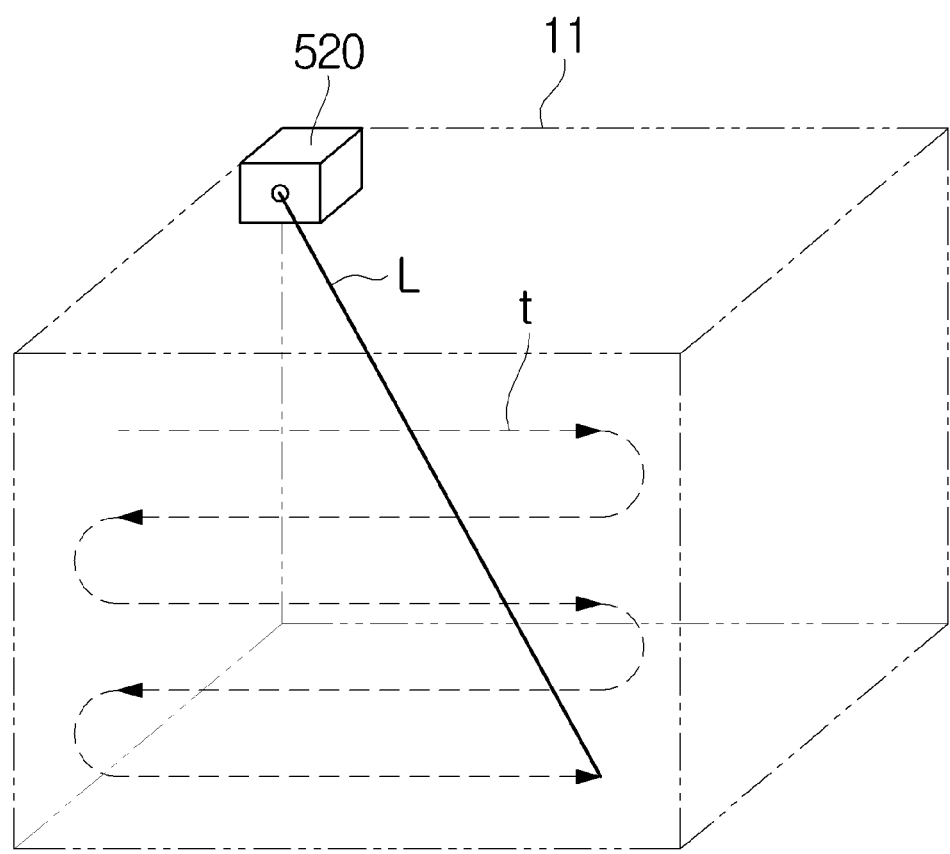
FIGS. 10A and 10B show how a light source provides heat into a cooking room, according to various embodiments of the present disclosure.
Figure 10B:
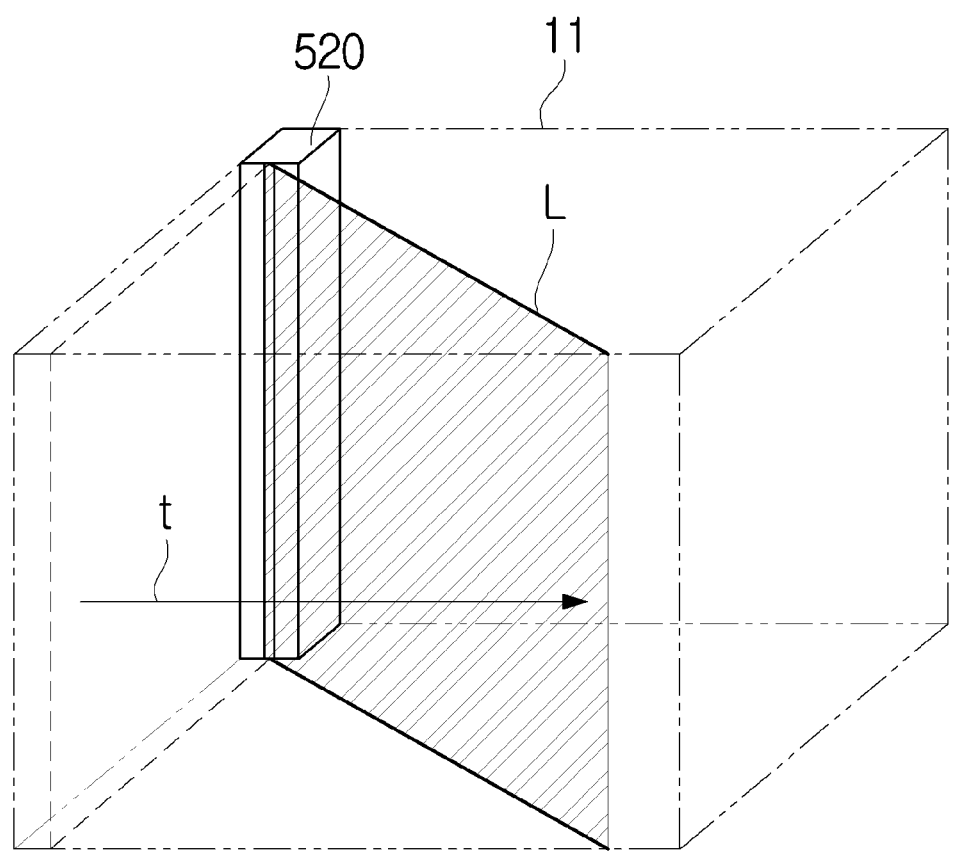

FIGS. 10A and 10B are diagrams for explaining how a light source provides heat into a cooking room, according to various embodiments, in which case, specifically, the light is irradiated on the full face of one of the inner walls of the cooking room 11.

Referring to FIG. 10A, the light source 520 may irradiate light of a dot form onto the inner wall of the cooking room 11. Accordingly, the light source 520 may change a direction of irradiation of light such that light L of a dot form is irradiated on the full face of the inner wall of the cooking room 11. In FIG. 10A, shown is a result of the light source 520 changing the direction of light irradiation, where the light L of a dot form is shifted across the entire face of an inner wall of the cooking room 11 along a direction t.

Alternatively, the light source 520 may irradiate light of the form of a line onto the inner wall of the cooking room 11. Referring to FIG. 10B, the light source 520 may irradiate light L having the form of a line onto the inner wall of the cooking room 11. In this case, unlike FIG. 10A, the light source 520 may irradiate light L of the form of a line onto the entire face of the inner wall of the cooking room 11 by changing the direction of irradiation of the light L to another direction. Referring to FIG. 10B, as the light source 520 changes the direction of light irradiation to another direction, the light of the form of a line may be shifted across the entire face of the inner wall of the cooking room 11 along the direction t.

The control panel 30 may include an input unit 31 for receiving a command to start cleaning mode for the cooking room 11 and a display 32 for displaying information about the cleaning mode, to perform input and output of the cleaning mode.

The input unit 31 may receive the command to start cleaning mode from the user to provide a cleaning environment to enable easy removal of contaminants inside the cooking room 11. The user may check an extent of contamination inside the cooking room 11 with his/her naked eye, and determine whether cleaning of the inside of the cooking room 11 is required. If the user determines that the contamination of the cooking room 11 is serious, the user may input the command to start cleaning mode through the input unit 31, and the cooking appliance 1 may provide the cleaning environment enabling easy removal of the contaminants by performing operation of preparation for cleaning in response to the command to start cleaning mode.

The display 32 may display information relating to the cleaning mode. The user may visually check the information displayed on the display 32 and input a proper control command through the input unit 31.

The controller 400 may control the respective elements for the cleaning appliance 1 to perform the cleaning mode. With screens displayed on the display 32, operation of the controller 400 will now be described.

Figure 11A:
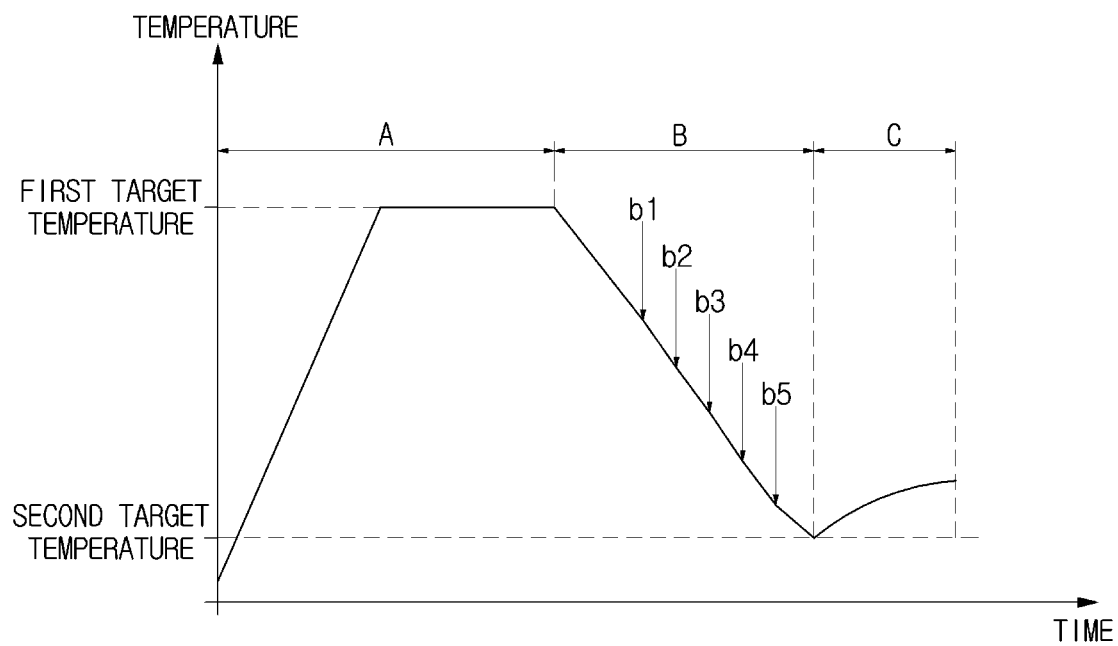
FIG. 11A is a graph of temperatures inside a cooking room while a cleaning mode is performed, according to an embodiment of the present disclosure.
Figure 11B:
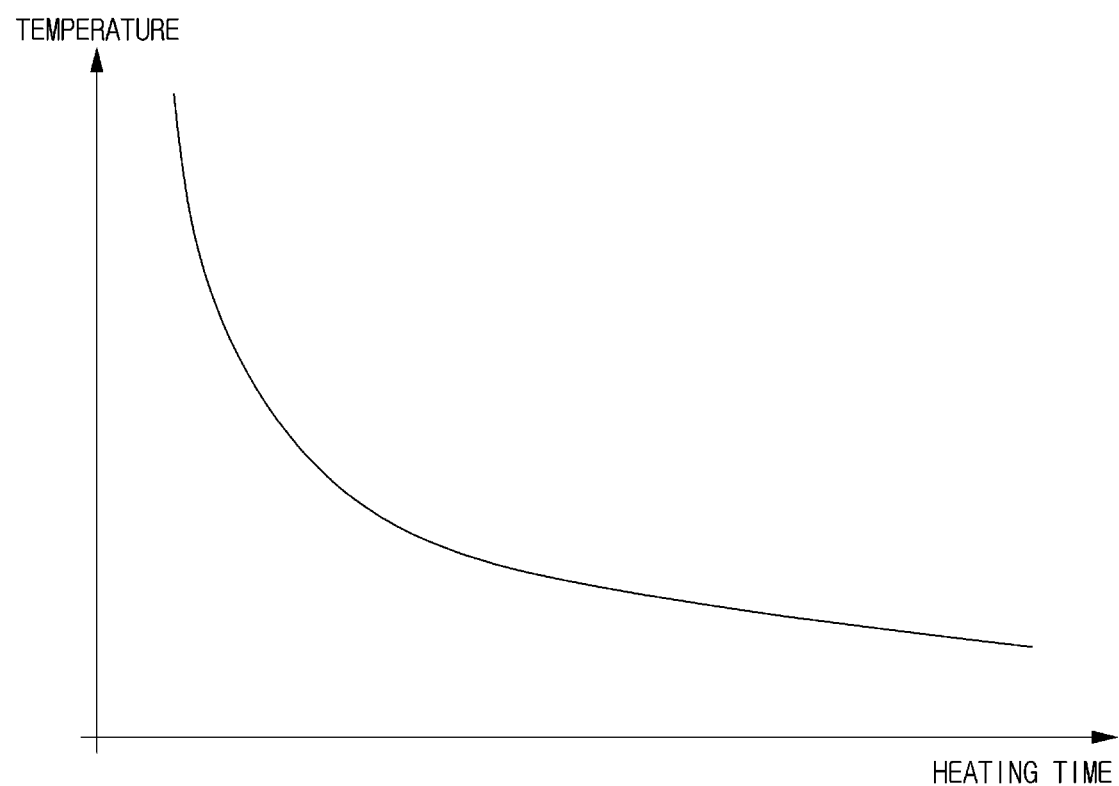
FIG. 11B is a graph representing relationships between a first target temperature and heating time in a cleaning mode, according to an embodiment of the present disclosure.
Figure 12:
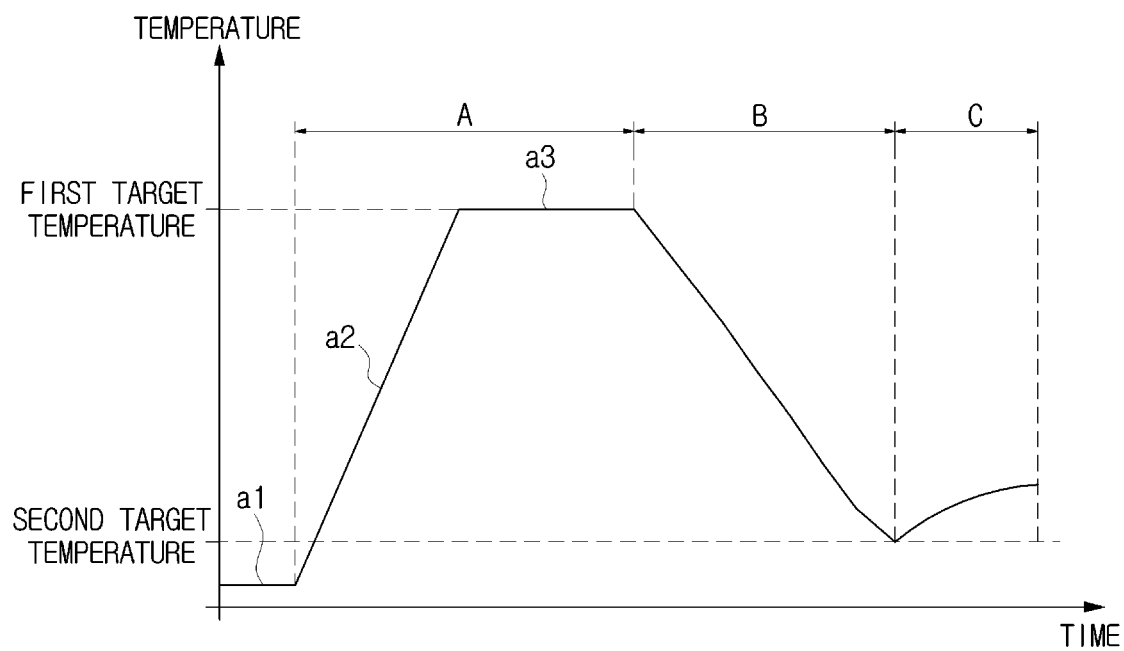
FIG. 12 is a view for explaining when to supply water, according to an embodiment of the present disclosure.

FIG. 11A is a graph of temperature inside a cooking room while a cleaning mode is performed, according to an embodiment of the present disclosure, FIG. 11B is a graph representing relations between first target temperature and heating time in the cleaning mode, according to an embodiment of the present disclosure, FIG. 12 is a view for explaining when to supply water, according to an embodiment of the present disclosure, and FIGS. 13A to 13D show screens displayed on a display while cleaning mode is performed, according to various embodiments of the present disclosure.

Figure 13A:
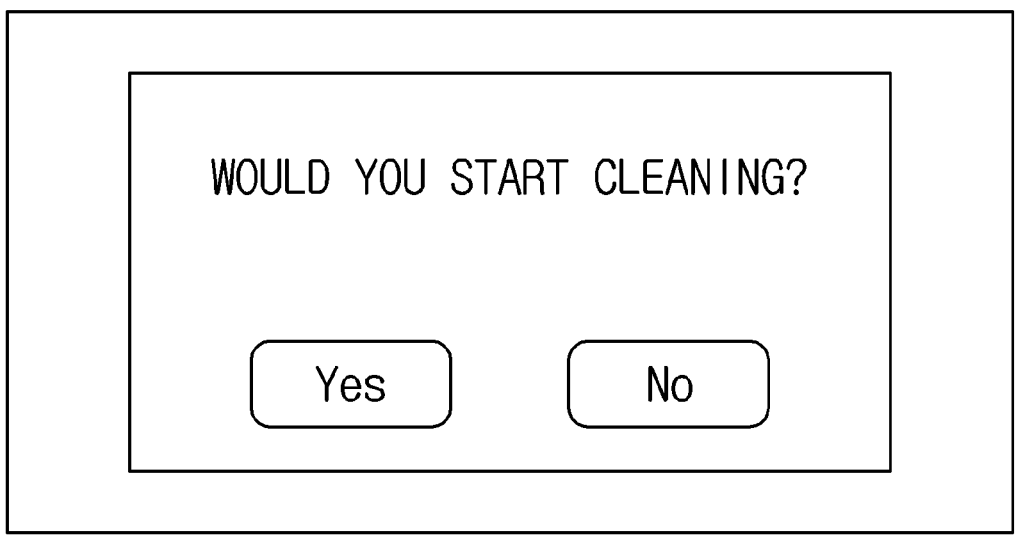
FIGS. 13A, 13B, 13C, and 13D show screens displayed by a display while cleaning mode is performed, according to various embodiments of the present disclosure.

Referring to FIG. 13A, the display 32 may display a screen asking whether to start cleaning mode. The user may check an extent of contamination inside the cooking room 11, and input a command to start cleaning mode, which is a control command to perform cleaning mode, through the input unit 31.

Once the command to start cleaning mode is received, the controller may enter a preparation stage for cleaning mode first. Specifically, the controller may determine whether a predetermined amount of water enough for performing cleaning mode is stored in the water supplier based on a water level detected by the water level measuring sensor 221. The water level measuring sensor 221 may be arranged in the steam generator or water supplier, and operation in the preparation stage for each case was described above in connection with FIGS. 5 to 8.

If the predetermined amount of water has not been stored in the water supplier, the controller may control the display to display an indication of water shortage in the water supplier. Further, the controller may control the display to display indication for water replenishment into the water supplier. The user may visually check through the display that there is not enough water stored in the water supplier for performing cleaning mode, and then replenish additional water in the water supplier.

On the other hand, if it is determined that the predetermined amount of water has been stored in the water supplier, the controller 400 may determine whether the door is closed and then enter the cleaning stage of the cleaning mode. In other words, if it is determined that there is enough water stored for performing the cleaning mode, the controller may control the temperature inside the cooking room 11 based on a predetermined target temperature after determining that the door is closed. Specifically, the controller 400 may control the cooking room heater 500 to provide heat into the cooking room 11, and control the pump assembly 350 to provide steam into the cooking room 11.

Referring to FIG. 11A, the controller 400 may control the cooking room heater 500 and the pump assembly 350 to perform operation of preparation for cleaning including a heating section in which the cooking room 11 is heated to the first target temperature for predetermined heating time, a cooling section in which the heated cooking room 11 is cooled down to a second target temperature lower than the first target temperature, and a steam generation section in which steam is generated from water that remains inside the cooled cooking room 11.

Referring to FIG. 11A, shown is heating section A including a section to maintain the inside of the cooking room at the predetermined first target temperature and a section to make the inside of the cooking room reach the predetermined first target temperature, but the heating section A may only include the section to maintain the inside of the cooking room at the predetermined first target temperature.

The first target temperature may refer to a temperature to amorphize contaminants adhered to the inner wall of the cooking room 11, which may be approximately 250° C. to approximately 400° C. This is because it is possible to amorphize the contaminants at approximately 250° C. or more, but the contaminants may be burned at higher than approximately 400° C. and may produce harmful gas and smoke accordingly, causing inconvenience to the consumer.

Length of the heating section may be determined based on the heating time, and the heating time may be determined by the controller 400 based on the first target temperature. Referring to FIG. 11B, the first target temperature and the heating time are inversely proportional to each other. In other words, the higher the first target temperature, the shorter the heating time, and the lower the first target temperature, the longer the heating time.

The controller 400 may heat the inside of the cooking room 11 according to the predetermined first target temperature and heating time corresponding to the first target temperature. For this, the controller 400 may provide heat into the cooking room 11 by heating the convection heater 50 or the heat coating 510, or may provide heat into the cooking room 11 by the light source 520 irradiating light onto the inner wall of the cooking room 11. Specifically, the controller 400 may control heating time, heating intensity, etc., of the convection heater 50 or the heat coating 510 through power applied, and control wavelength, energy, direction of light for irradiation of the light source 520, etc.

Figure 13B:
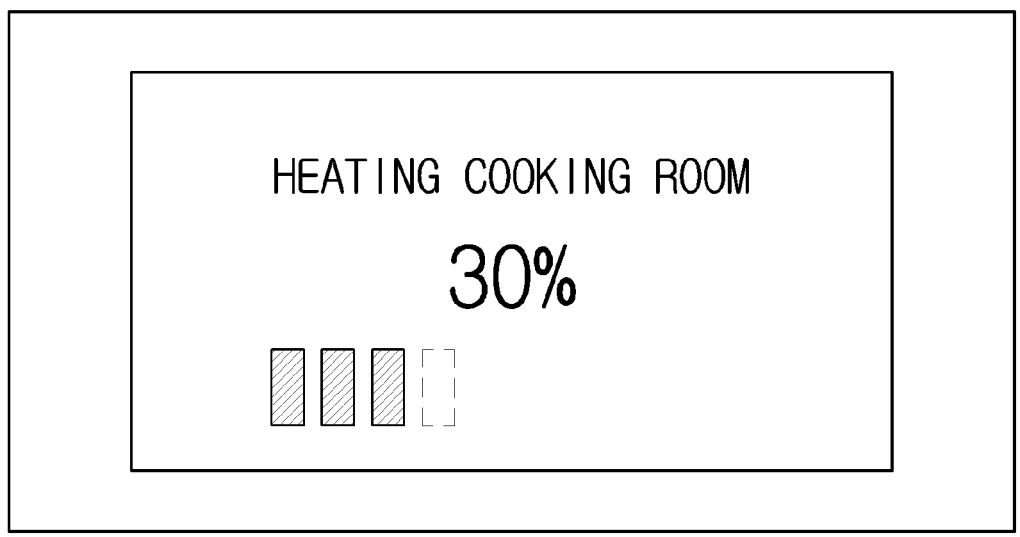

Furthermore, the controller 400 may control the display 32 to display an operation being performed in a heating section. Specifically, the display 32 may display a screen to indicate that the cooking appliance 1 is performing cleaning mode in the current heating section. Especially, the display 32 may display information about how much the heating section has been progressed in various ways. In FIG. 13B, shown is the display 32 displaying an extent of progress of the heating section in percentage as well as in a progress bar. This may enable the user to visually and easily check the extent of progress of the heating section during the operation of preparation for cleaning.

Once the heating section is ended, i.e., once the heating time corresponding to the first target temperature is over, the controller 400 may enter the cooling section in the cleaning stage. Referring to section B that refers to the cooling section in FIG. 11A, the controller 400 may stop operation of the cooking room heater 500 until the temperature of the inside of the cooking room 11 is cooled down to the predetermined second target temperature.

The second target temperature may refer to a temperature to condense steam remaining inside the cooking room 11 on the inner wall of the cooking room 11, which may be less than approximately 80° C. This is because the steam may be condensed when the temperature of the inner wall of the cooking room is less than approximately 80° C. under the assumption that steam for operation of preparation for cleaning is formed from water typically at approximately 80° C. to approximately 100° C.

Furthermore, the controller 400 may provide water into the cooking room 11 to shorten the length of the cooling section, i.e., the cooling time. Specifically, the controller 400 may control the pump assembly 350 to supply a predetermined amount of water into the cooking room 11 at a predetermined point of time to supply water during the cooling section.

The controller 400 may control the pump assembly 350 to supply all the predetermined amount of water into the cooking room 11 in the first round of time to supply water. If the predetermined amount of water is 1 liter (L), the controller 400 may control the pump assembly 350 to provide all the water of 1 L into the cooking room 11 at a point of time to supply water during the cooling section.

Alternatively, the controller 400 may control the pump assembly 350 to supply a division of the predetermined amount of water into the cooking room 11 at each of a plurality of points of time to supply water. Referring to FIG. 11A, as for the points of time to supply water b1 to b5, the controller 400 may divide the predetermined amount of water by the plurality of points of time to supply water and provide the division at each point of time. In this regard, the controller 400 may provide equal or different divisions of water into the cooking room 11 at the plurality of points of time to supply water. For example, in a case that the predetermined amount of water is 1 L, the controller 400 may control the pump assembly 350 to supply 0.2 L of water at each of the points b1 to b5, or control the pump assembly 350 to supply different amounts of water at the points b1 to b5, making a total of 1 L of water supplied.

Furthermore, the controller 400 may take into account a coated state of the inner wall of the cooking room 11 in determining a point of time to supply water. If water is supplied while the inside of the cooking room has high temperature, it is likely to have a crack on the coating of the inner wall of the cooking room 11. Taking this into account, the controller 400 may determine a proper point of time to supply water and control the pump assembly 350 to supply water into the cooking room 11 at the point of time.

Because the temperature inside the cooking room lies between the first and second target temperatures during the cooling section, some of the water inside the cooking room may be changed in state to steam or some may remain on one face of the cooking room.

Once the cooling section is completed, i.e., when the temperature inside the cooking room 11 reaches the second target temperature, the controller 400 may enter the steam generation section while in the operation of preparation for cleaning. Referring to section C, which refers to the cooling section in FIG. 11A, the controller 400 may provide heat into the cooking room 11 such that the water remaining on one face of the cooking room 11 may be changed in state to steam.

Especially, the controller 400 may trigger state transformation of water remaining inside the cooking room 11 by heating the inner wall of the cooking room 11 with water remaining thereon. For example, if some water remains on the bottom face of the cooking room 11, the controller 400 may generate steam by heating a heating substance 312 that directly heats the bottom face of the cooking room 11. Alternatively, the controller 400 may direct the light from the light source 520 toward the bottom face of the cooking room 11 to make it possible for the water remaining on the bottom face to be changed in state.

The steam generated in this way may easily enter between the amorphized contaminants and the inner wall of the cooking room 11 and may then be condensed into water due to the cooled inner wall, thereby helping the contaminants separated easily from the inner wall of the cooking room 11.

Figure 13C:
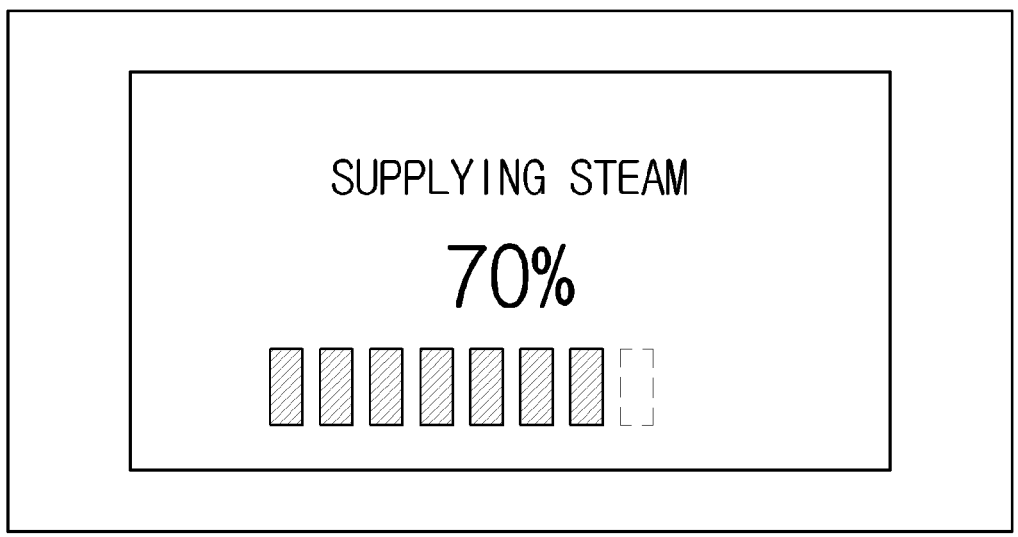

Furthermore, the controller 400 may control the display 32 to display an operation being performed in the steam generation section. Specifically, the display 32 may display a screen to indicate that the cooking appliance 1 is performing operation of preparation for cleaning in the current steam generation section. Especially, the display 32 may display information about how much the steam generation section has been progressed in various ways. In FIG. 13C, shown is the display 32 displaying an extent of progress of the steam generation section in percentage as well as in a progress bar. This may enable the user to visually and easily check the extent of progress of the steam generation section during cleaning operation in the cleaning mode.

Figure 13D:

Once the steam generation section is ended, the controller 400 may control the display 32 to display a screen to indicate that the cleaning mode is completed and prompt removal of contaminants inside the cooking room 11. Because the fact that the cleaning mode is completed means that there is water remaining in between the inner wall of the cooking room 11 and the contaminants adhered to the inner wall, which makes it easy to remove the contaminants, the controller 400 may prompt the user to clean the inside of the cooking room 11 by displaying an indication for the user to remove the contaminants through the display 32, as shown in FIG. 13D. The user may visually check the indication to remove contaminants displayed on the display 32, and easily remove the contaminants from the inner wall of the cooking room 11 by applying physical force to the contaminants.

It has thus far been described that a predetermined amount of water is supplied to the cooking room at at least one predetermined point of time to supply water in the cooling section. However, the at least one point of time to supply water may be set before the cooling section as well.

Referring to FIG. 12, prior to the cooling section B, i.e., in the heating section A, the at least one point of time to supply water may be set. For example, point a2 during a period in which the inside of the cooking room is reaching the predetermined first target temperature may be set as a point of time to supply water, or point a3 during a period in which the inside of the cooking room is maintaining the first target temperature may be set as a point of time to supply water. Further, a point of time before the heating section A, i.e., point a1 before the cooking room heater is driven may be set as the point of time to supply water.

As such, even if a predetermined amount of water is supplied to the cooking room at at least one point of time to supply water before the heating section, the subsequent operation may be the same as in the aforementioned embodiment.

As described above, a cleaning stage of the cleaning mode includes heating section, cooking section, and steam generation section. In an embodiment, the cleaning stage may further include a steam heating section.

Once the steam generation section is ended, the controller 400 may heat the cooking room 11 using the cooking room heater 500 to make the generated steam reach to a predetermined third target temperature. The third target temperature may refer to a temperature, at which the generated steam turns to superheated steam heated above the boiling point, and may be approximately 300° C. or higher.

Once the steam inside the cooking room 11 turns to the superheated steam through the steam heating section, the cooking appliance 1 may provide an environment for the user to remove contaminants more easily.

In the aforementioned embodiment, water for steam generation is supplied by the pump assembly 350 into the cooking room 11 in the cooling section. However, in an embodiment, there may be a predetermined amount of water already present inside the cooking room 11 before the cleaning mode begins.

For example, if the user supplies a predetermined amount of water (e.g., 1 L) into the cooking room 11 and then inputs a command to start cleaning mode through the input unit 31, the controller 400 may perform a cleaning stage of the cleaning mode, which includes the heating section, cooling section, and steam generation section. In this regard, the controller 400 may not control the pump assembly 350 to supply water into the cooking room 11 in the cooling section.

Figure 14:
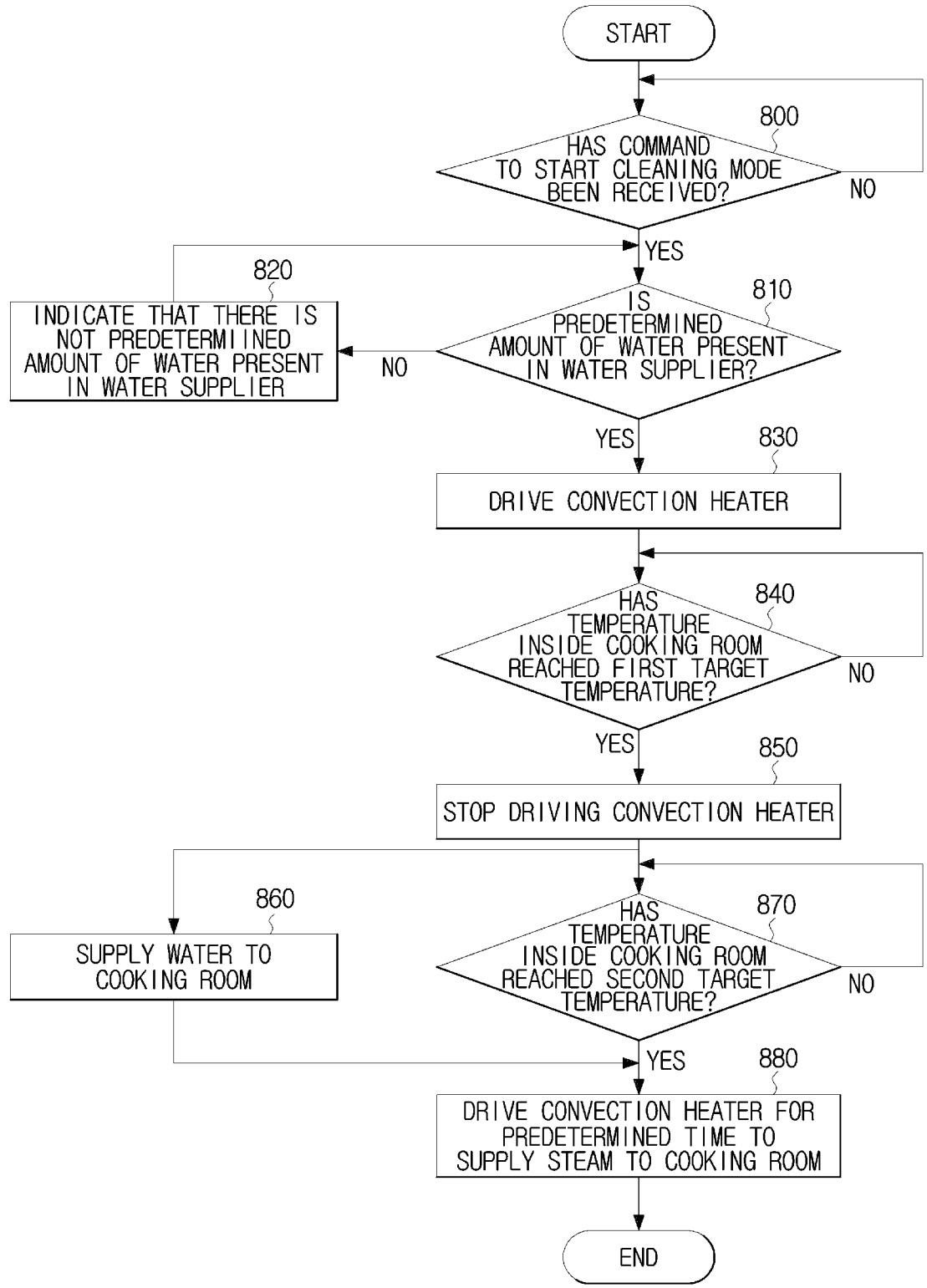
FIG. 14 is a flowchart illustrating a method for controlling a cooking appliance, according to an embodiment of the present disclosure.

FIG. 14 is a flowchart of a method for controlling a cooking appliance, according to an embodiment of the present disclosure, under the assumption that the cooking room heater is a heating substance.

First, the cleaning appliance 1 determines whether a command to start cleaning mode has been received (operation 800). If the command to start cleaning mode has not been received, the cooking appliance 1 repeatedly performs the determination process.

On the other hand, if the command to start cleaning mode has been received, the cooking appliance 1 determines whether there is a predetermined amount of water present in the water supplier 100 of the pump assembly 350 (operation 810). If the predetermined amount of water is not present in the water supplier 100, the cooking appliance 1 indicates that the predetermined amount of water is not present in the water supplier 100 (operation 820). The user may visually check this, and then replenish water to the water supplier 100.

On the other hand, if there is the predetermined amount of water present in the water supplier 100 or if it is determined that the predetermined amount of water is replenished in the water supplier 100 after the indication that the predetermined amount of water is not present in the water supplier 100 is displayed, the cooking appliance 1 may drive the convection heater 50 (operation 830).

Once the convection heater 50 is driven, the cooking appliance 1 determines whether the temperature inside the cooking room 11 has reached the first target temperature (operation 840). The first target temperature may refer to a temperature to amorphize contaminants adhered to the inner wall of the cooking room 11, and may be approximately 250° C. to approximately 400° C. This is because the contaminants may be amorphized at approximately 250° C. or more, but the contaminants may be burned at higher than approximately 400° C. and may produce harmful gas and smoke accordingly, causing inconvenience to the consumer.

If the temperature inside the cooking room 11 is less than the first target temperature, the cooking appliance 1 may repeatedly perform the process of determination of whether the temperature inside the cooking room 11 has reached the first target temperature.

On the other hand, if the temperature inside the cooking room 11 has reached the first target temperature, the cooking appliance 1 may stop driving the convection heater 50 (operation 850). Once driving of the convection heater 50 is stopped, the cooking appliance 1 may supply a predetermined amount of water contained in the water supply 100 into the cooking room 11 at a predetermined point of time to supply water (operation 860).

Furthermore, when the driving of the convection heater 50 is stopped, the cooking appliance 1 determines whether the temperature inside the cooking room 11 has reached the second target temperature (operation 870). The second target temperature may refer to a temperature to condense steam remaining inside the cooking room 11 on the inner wall of the cooking room 11, which may be less than approximately 80° C. This is because the steam may be condensed when the temperature of the inner wall of the cooking room is less than approximately 80° C. under the assumption that steam for operation of preparation for cleaning is formed from water typically at approximately 80° C. to approximately 100° C.

If the temperature inside the cooking room 11 exceeds the second target temperature, the cooking appliance 1 may repeatedly perform the process of determination of whether the temperature inside the cooking room 11 exceeds the second target temperature.

On the other hand, if water supply at a predetermined point of time is completed and the temperature inside the cooking room 11 reaches the second target temperature, the cooking appliance 1 heats the inner wall of the cooking room 11 with water remaining thereon by heating the convection heater 50 to supply steam into the cooking room 11 (operation 880). Consequently, the water remaining on the inner wall of the cooking room 11 heated by the convection heater 50 may be changed in state to steam, and the steam may be condensed between the contaminants and the inner wall of the cooking room 11, producing a state favorable to easy removal of the contaminants.

Finally, the cooking appliance 1 may display an indication to prompt removal of contaminants inside the cooking room 11. The user may visually check this and remove the contaminants inside the cooking room 11 by applying physical force to the contaminants inside the cooking room 11.

Figure 15:
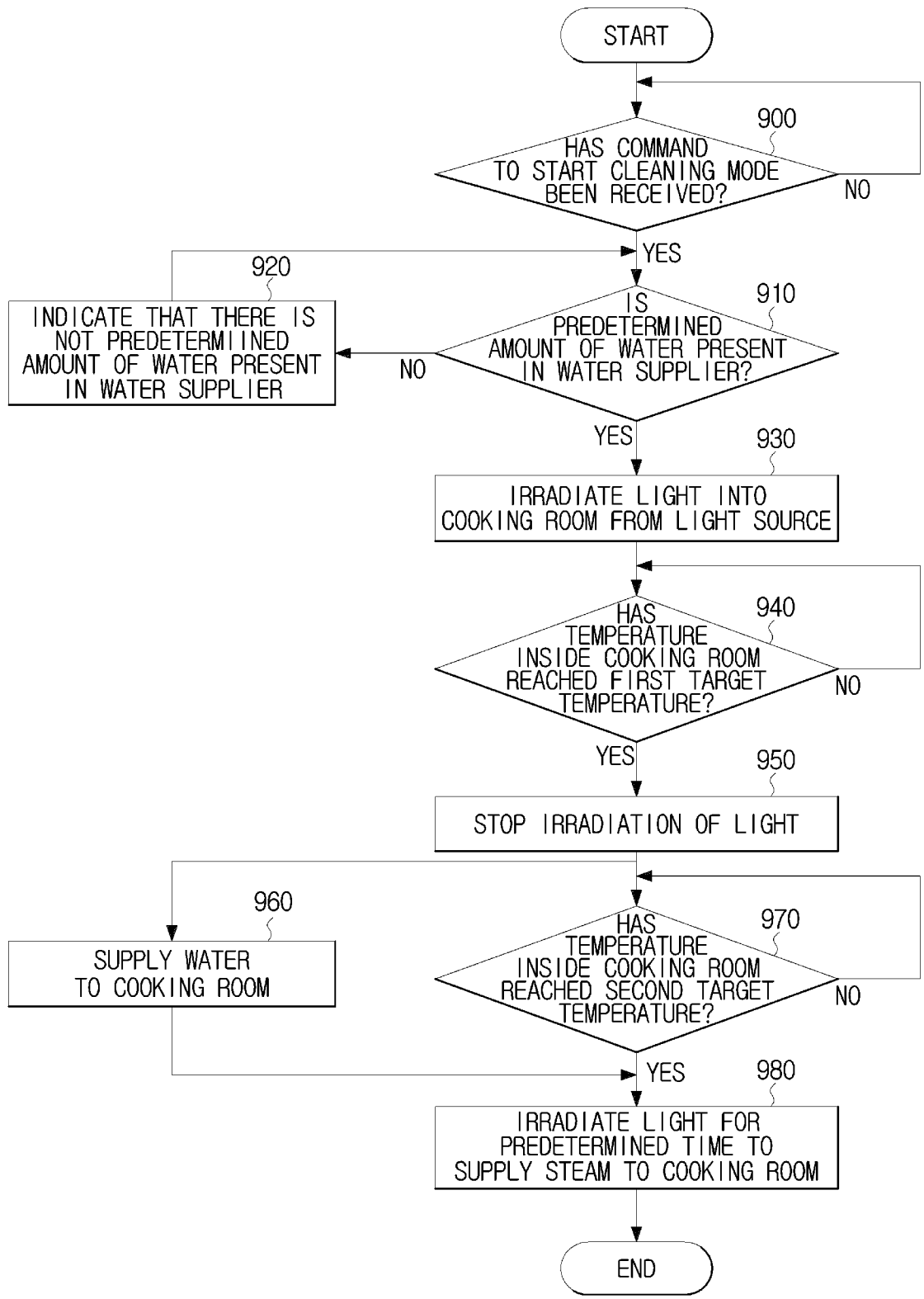
FIG. 15 is a flowchart illustrating a method for controlling a cooking appliance, according to an embodiment of the present disclosure.

FIG. 15 is a flowchart of a method for controlling a cooking appliance, according to an embodiment of the present disclosure, under the assumption that the cooking room heater is a light source.

First, the cleaning appliance 1 determines whether a command to start cleaning mode has been received (operation 900). If the command to start cleaning mode has not been received, the cooking appliance 1 repeatedly performs the determination process.

On the other hand, if the command to start cleaning mode has been received, the cooking appliance 1 determines whether there is a predetermined amount of water present in the water supplier 100 of the pump assembly 350 (operation 910). If the predetermined amount of water is not present in the water supplier 100, the cooking appliance 1 indicates that the predetermined amount of water is not present in the water supplier 100 (operation 920). The user may visually check this, and then replenish water to the water supplier 100.

On the other hand, if there is the predetermined amount of water present in the water supplier 100 or if it is determined that the predetermined amount of water is replenished in the water supplier 100 after the indication that the predetermined amount of water is not present in the water supplier 100 is displayed, the cooking appliance 1 may irradiate light on the inner wall of the cooking room 11 using the light source 520 (operation 930).

Once the light is irradiated on the inner wall of the cooking room 11, the cooking appliance 1 determines whether the temperature inside the cooking room 11 has reached the first target temperature (operation 940). The first target temperature may refer to a temperature to amorphize contaminants adhered to the inner wall of the cooking room 11, and may be approximately 250° C. to approximately 400° C. This is because the contaminants may be amorphized at approximately 250° C. or more, but the contaminants may be burned at higher than approximately 400° C. and may produce harmful gas and smoke accordingly, causing inconvenience to the consumer.

If the temperature inside the cooking room 11 is less than the first target temperature, the cooking appliance 1 may repeatedly perform the process of determination of whether the temperature inside the cooking room 11 has reached the first target temperature.

On the other hand, if the temperature inside the cooking room 11 has reached the first target temperature, the cooking appliance 1 stops light irradiation from the light source 520 (operation 950). Once the light irradiation from the light source is stopped, the cooking appliance 1 may supply a predetermined amount of water contained in the water supply 100 into the cooking room 11 at a predetermined point of time to supply water (operation 960).

Furthermore, when the light irradiation from the light source 520 is stopped, the cooking appliance 1 determines whether the temperature inside the cooking room 11 has reached the second target temperature (operation 970). The second target temperature may refer to a temperature to condense steam remaining inside the cooking room 11 on the inner wall of the cooking room 11, which may be less than approximately 80° C. This is because the steam may be condensed when the temperature of the inner wall of the cooking room is less than approximately 80° C. under the assumption that steam for operation of preparation for cleaning is formed from water typically at approximately 80 to approximately 100° C.

If the temperature inside the cooking room 11 exceeds the second target temperature, the cooking appliance 1 may repeatedly perform the process of determination of whether the temperature inside the cooking room 11 exceeds the second target temperature.

On the other hand, if water supply at a predetermined point of time is completed and the temperature inside the cooking room 11 reaches the second target temperature, the cooking appliance 1 may irradiate light on the inner wall of the cooking room 11 with water remaining thereon, by using the light source 520 to supply steam into the cooking room 11 (operation 980). Consequently, the water remaining on the inner wall of the cooking room 11 irradiated with light may be changed in state to steam, and the steam may be condensed between the contaminants and the inner wall of the cooking room 11, producing a state favorable to easy removal of the contaminants.

Finally, the cooking appliance 1 may display an indication to prompt removal of contaminants inside the cooking room 11. The user may visually check this and remove the contaminants inside the cooking room 11 by applying physical force to the contaminants inside the cooking room 11.

According to embodiments of the present disclosure, a cooking appliance and method for controlling the same may provide an environment for the user to easily clean the cooking appliance by heating the inside of the cooking room with a temperature to enable an amorphization process of contaminants.

Furthermore, an environment may be provided to easily remove the contaminants from the inner wall of the cooking room by supplying steam to the amorphized contaminants.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

DESCRIPTION OF THE SYMBOLS

1: COOKING APPLIANCE
31: INPUT UNIT
32: DISPLAY
50: CONVECTION HEATER
350: PUMP ASSEMBLY
400: CONTROLLER
500: COOKING ROOM HEATER
510: HEAT COATING
520: LIGHT SOURCE

What is claimed is:
1. A cooking appliance comprising:
a display;
a main body configured to have a cooking compartment;
a cooking compartment heater configured to provide heat to the cooking compartment;
a water supplier configured to store water;
a sensor configured to detect an amount of the stored water in the water supplier;

a pump assembly configured to transfer the stored water from the water supplier to the cooking compartment; and a controller configured to determine whether a first predetermined amount of the stored water is stored in the water supplier in response to receiving a command to start a cleaning operation, control the cooking compartment heater to heat the cooking compartment to a first target temperature for a predetermined heating time in response to determining that the first predetermined amount of the stored water is stored in the water supplier, control the pump assembly to transfer a second predetermined amount of the stored water to the cooking compartment at least one of before and during the predetermined heating time to thereby provide steam to the cooking compartment, and control the display to display an indication of water shortage in the water supplier in response to determining that the first predetermined amount of water is not stored in the water supplier.

2. The cooking appliance of claim 1, further comprising:
a steam generator configured to supply steam to cooking compartment.

3. The cooking appliance of claim 2,
wherein the pump assembly comprises:
a first pump configured to transfer the stored water from the water supplier to the steam generator;
a second pump configured to transfer the stored water from the steam generator to the water supplier; and
a third pump configured to transfer the stored water from the water supplier to the cooking compartment.

4. The cooking appliance of claim 3, further comprising:
a connecting pipe configured to connect the third pump with the cooking compartment.

5. The cooking appliance of claim 3, wherein the steam generator comprises a water level measurer configured to measure a level of water in the steam generator.

6. The cooking appliance of claim 5,
wherein the controller is further configured to control the second pump to return the water transferred to the steam generator to the water supplier based on the level of water in the steam generator.

7. The cooking appliance of claim 1,
wherein the controller is further configured to control the pump assembly to one of:
transfer an entire amount of the second predetermined amount of water to the cooking compartment at one time, and
transfer a first portion of the second predetermined amount of water to the cooking compartment at a first time, and transfer a second portion of the second predetermined amount of water to the cooking compartment at a second time.

8. The cooking appliance of claim 1,
wherein the controller is further configured to,
when the cooking compartment is cooled down from the first target temperature to a second target temperature less than the first target temperature, control the cooking compartment heater to heat at least one face of the cooking compartment with water remaining thereon to generate steam, and heat the cooking compartment to a third target temperature.

9. The cooking appliance of claim 1,
wherein the cooking compartment heater comprises a convection heater.

10. The cooking appliance of claim 1,
wherein the cooking compartment heater comprises a heat coating, configured to be heated by electric power, provided on at least one inner wall of the cooking compartment.

11. The cooking appliance of claim 1,
wherein the cooking compartment heater comprises a light source configured to irradiate light on at least one inner wall of the cooking compartment.

12. The cooking appliance of claim 1,
wherein the controller is further configured to control the display to display an indication to remove contaminants inside the cooking compartment after the cleaning operation is completed.

13. A method for controlling a cooking appliance, the method comprising:
receiving, by the cooking appliance, a command to start a cleaning operation of the cooking appliance;
determining, by a sensor configured to detect an amount of a stored water in a water supplier, whether a first predetermined amount of the stored water is stored in the water supplier in response to receiving the command to start the cleaning operation;
heating a cooking compartment of the cooking appliance to a first target temperature for a predetermined heating time in response to determining that the first predetermined amount of the stored water is stored in the water supplier;
transferring a second predetermined amount of water from a water supplier to the cooking compartment at least one of before and during the predetermined heating time to thereby provide steam to the cooking compartment; and
controlling a display to display an indication of water shortage in the water supplier in response to determining that the first predetermined amount of water is not stored in the water supplier.

14. The method of claim 13, wherein the transferring the predetermined amount of water comprises one of:
transferring an entire amount of the second predetermined amount of water to the cooking compartment at one time, and
transferring a first portion of the second predetermined amount of water to the cooking compartment at a first time, and transferring a second portion of the second predetermined amount of water to the cooking compartment at a second time.

15. The method of claim 13, wherein the first target temperature is from approximately 250° C. to approximately 400° C.

16. The method of claim 13, further comprising:
when the cooking compartment is cooled down from the first target temperature to a second target temperature less than the first target temperature, heating at least one face of the cooking compartment with water remaining thereon to generate steam; and
heating the cooking compartment to a third target temperature.

17. The method of claim 13, wherein the heating is performed by a convection heater.

18. The method of claim 13, wherein the heating comprises
applying electric power to a heat coating provided on at least one inner wall of the cooking compartment.

19. The cooking appliance of claim 1, further comprising:
an input interface configured to receive the command to start the cleaning operation.

\* \* \* \* \*